(12) United States Patent
Fuju et al.

(10) Patent No.: US 8,696,773 B2
(45) Date of Patent: Apr. 15, 2014

(54) REFORMING APPARATUS FOR FUEL CELL

(75) Inventors: Akira Fuju, Gunma (JP); Masataka Kadowaki, Gunma (JP); Kazumi Kobayashi, Saitama (JP); Kazuaki Nakajima, Naga (JP); Yasushi Sato, Kanagawa (JP); Ken Samura, Kanagawa (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 0 days.

(21) Appl. No.: 13/431,651

(22) Filed: Mar. 27, 2012

(65) Prior Publication Data
US 2012/0237839 A1 Sep. 20, 2012

Related U.S. Application Data

(62) Division of application No. 12/238,859, filed on Sep. 26, 2008, now Pat. No. 8,178,062.

(30) Foreign Application Priority Data

| Sep. 27, 2007 | (JP) | 2007-252653 |
| Sep. 27, 2007 | (JP) | 2007-252654 |
| Sep. 27, 2007 | (JP) | 2007-252655 |
| Sep. 27, 2007 | (JP) | 2007-252656 |
| Sep. 27, 2007 | (JP) | 2007-252657 |
| Sep. 27, 2007 | (JP) | 2007-252658 |
| Mar. 18, 2008 | (JP) | 2008-070054 |
| Mar. 18, 2008 | (JP) | 2008-070055 |

(51) Int. Cl.
*B01J 7/00* (2006.01)

(52) U.S. Cl.
USPC ............ 48/61; 48/76; 48/203; 48/127.9; 48/127.1; 48/85; 48/63; 48/108; 48/198.3; 48/198.6; 48/214 R; 422/625; 422/600; 422/621; 422/626; 422/627; 422/629; 422/638; 422/642; 422/644; 422/645; 422/646

(58) Field of Classification Search
USPC .......... 48/61, 127.9, 127.1, 76, 203; 422/625, 422/600, 621, 626–627, 629, 644–646, 638
See application file for complete search history.

(56) References Cited

U.S. PATENT DOCUMENTS

| 6,159,434 A | * | 12/2000 | Gonjo et al. | ............... 422/626 |
| 6,576,203 B2 | * | 6/2003 | Abe et al. | .................. 422/626 |

(Continued)

FOREIGN PATENT DOCUMENTS

| CN | 1223622 A | 7/1999 |
| JP | 02-188406 | 7/1990 |

(Continued)

OTHER PUBLICATIONS

Japanese Office Action, and English translation thereof, issued in Japanese Patent Application No. 2007-252658 dated Jul. 24, 2012.

(Continued)

*Primary Examiner* — Kaity V. Handal
(74) *Attorney, Agent, or Firm* — McDermott Will & Emery LLP

(57) ABSTRACT

In a reforming apparatus, for use in a fuel cell, for reforming a raw fuel into a hydrogen-rich reformed gas, a reformer generates the reformed gas from the raw fuel. A shift reactor reduces carbon monoxide contained in the reformed gas through a shift reaction. A selective oxidation unit reduces the carbon monoxide contained in the reformed gas that has passed through the shift reactor by performing selective oxidation on the carbon monoxide. A reforming reaction tube houses linearly the reformer, the shift reactor and the selective oxidation unit in this order.

4 Claims, 18 Drawing Sheets

(56) References Cited

U.S. PATENT DOCUMENTS

| | | | |
|---|---|---|---|
| 6,828,048 | B2 | 12/2004 | Margiott et al. |
| 6,835,354 | B2 * | 12/2004 | Woods et al. ............... 422/139 |
| 7,066,973 | B1 * | 6/2006 | Bentley et al. ............. 48/197 R |
| RE39,675 | E | 6/2007 | Kudo et al. |
| 7,338,644 | B2 | 3/2008 | Sevenhuijsen et al. |
| 7,887,606 | B2 * | 2/2011 | Mizusawa et al. ......... 48/197 R |
| 2006/0112637 | A1 * | 6/2006 | An et al. ......................... 48/61 |
| 2007/0028522 | A1 | 2/2007 | Mizusawa et al. |
| 2007/0104625 | A1 * | 5/2007 | Su .............................. 422/189 |
| 2007/0172401 | A1 | 7/2007 | Wanninger et al. |
| 2007/0243436 | A1 * | 10/2007 | Deshpande et al. ........... 429/24 |

FOREIGN PATENT DOCUMENTS

| | | | |
|---|---|---|---|
| JP | 08-165103 | | 6/1996 |
| JP | 10-007402 | A | 1/1998 |
| JP | 2000-026104 | | 1/2000 |
| JP | 2000-243425 | | 9/2000 |
| JP | 2000-247601 | A | 9/2000 |
| JP | 2001-089105 | A | 4/2001 |
| JP | 2001-180909 | | 7/2001 |
| JP | 2002-025591 | | 1/2002 |
| JP | 2002-356308 | | 12/2002 |
| JP | 2003-012302 | | 1/2003 |
| JP | 2003-086210 | | 3/2003 |
| JP | 2003-132926 | A | 5/2003 |
| JP | 2003 160306 | A | 6/2003 |
| JP | 2003-165709 | A | 6/2003 |
| JP | 2003-272691 | A | 9/2003 |
| JP | 2003-530664 | A | 10/2003 |
| JP | 2004-075435 | A | 3/2004 |
| JP | 2004-531447 | A | 10/2004 |
| JP | 2005-263603 | | 9/2005 |
| JP | 2007-015911 | | 1/2007 |
| JP | 2007-022861 | A | 2/2007 |
| JP | 2007-55892 | A | 3/2007 |
| JP | 2007-126330 | A | 5/2007 |
| JP | 2007-242491 | A | 9/2007 |
| WO | 98/00361 | A1 | 1/1998 |
| WO | WO-98/00361 | A1 | 1/1998 |
| WO | WO-0177585 | A1 | 10/2001 |
| WO | WO-02085781 | A1 | 10/2002 |
| WO | WO 03/078311 | A1 | 9/2003 |
| WO | WO 2007/040146 | A1 | 4/2007 |

OTHER PUBLICATIONS

Japanese Notification of Reasons for Refusal, with English Translation, issued in Japanese Patent Application No. 2007-252654, dated Feb. 28, 2012.

Japanese Notification of Reasons for Refusal, with English Translation, issued in Japanese Patent Application No. 2007-252655, dated Feb. 28, 2012.

Japanese Notification of Reasons for Refusal, with English Translation, issued in Japanese Patent Application No. 2007-252656, dated Feb. 28, 2012.

Japanese Office Action, and English translation thereof, issued in Japanese Patent Application No. 2007-252656 dated Jun. 26, 2012.

Japanese Office Action, and English translation thereof, issued in Japanese Patent Application No. 2007-252655 dated Jun. 26, 2012.

Japanese Office Action, and English translation thereof, issued in Japanese Patent Application No. 2008-070055 dated Jul. 3, 2012.

Japanese Office Action issued in Japanese Patent Application No. 2008-070054 dated Jul. 3, 2012.

Japanese Office Action, and English translation thereof, issued in Japanese Patent Application No. 2007-252654 dated Jun. 26, 2012.

Taiwanese Notification of Reason(s) for Rejection, w/ English translation thereof, issued in Taiwanese Application No. TW 097136817 dated Aug. 20, 2013.

* cited by examiner

REFORMING APPARATUS FOR FUEL CELL

CROSS-REFERENCE TO RELATED APPLICATIONS

This application is a Divisional of U.S. application Ser. No. 12/238,859, filed on Sep. 26, 2008, now U.S. Pat. No. 8,178,062 which is based upon and claims the benefit of priority from the prior Japanese Patent Application No. 2007-252653, filed on Sep. 27, 2007, Japanese Patent Application No. 2007-252654, filed on Sep. 27, 2007, Japanese Patent Application No. 2007-252655, filed on Sep. 27, 2007, Japanese Patent Application No. 2007-252656, filed on Sep. 27, 2007, Japanese Patent Application No. 2007-252657, filed on Sep. 27, 2007, Japanese Patent Application No. 2007-252658, filed on Sep. 27, 2007, Japanese Patent Application No. 2008-070054, filed on Mar. 18, 2008 and Japanese Patent Application No. 2008-070055, filed on Mar. 18, 2008, the entire contents of which are incorporated herein by reference.

BACKGROUND OF THE INVENTION

1. Field of the Invention

The present invention relates to a reforming apparatus, for use in a fuel cell, which reforms raw fuel into a reformed gas used in a fuel cell system.

2. Description of the Related Art

A polymer electrolyte fuel cell (PEFC) produces electric power by converting chemical energy of hydrogen into electric energy. For practical purposes, the hydrogen used as a fuel for the polymer electrolyte fuel cell is obtained in a manner that a hydrocarbon gas, such as natural gas or naphtha relatively easily procurable at a relatively low cost, or a raw fuel gas of an alcohol type, such as methanol, and steam are mixed together and then reformed by a reformer. The hydrogen gas obtained by the reforming is supplied to a fuel electrode of the fuel cell and used to generate electricity.

A reformer is generally provided with a burner for supplying the heat required for the reforming reaction of the raw fuel through steam. Combustion gas produced by combusting the fuel by the burner is led from a combustion cylinder to a pathway provided in the vicinity of a reforming reaction unit. As a result, the thermal energy of the combustion gas is used for the reforming reaction.

As an odorant to facilitate the detection of a gas leakage, an organosulfur component is added to the utility gas or propane gas used as the raw fuel gas. When the utility gas, propane gas or the like containing the organosulfur component is directly supplied to the reformer, the organosulfur component is adhered to catalyst in the reformer, thus deteriorating the reforming performance of the reformer. Accordingly, a reforming apparatus provided with a desulfurizer has been conceived.

However, in a conventional reformer, a combustion exhaust gas generated by the fuel combustion in the burner flows inside the reformer and thereby the thermal energy of the combustion exhaust gas is used to generate high-temperature steam or to raise the temperature of the reformer. As a result, the reformer must be placed outside a combustion exhaust gas passage. Also, a shift reactor or a carbon monoxide remover for reducing the carbon monoxide contained in the reformed gas produced by the reformer is placed further outside a passage having the reformer therein. As a result, the passage gets complicated. Therefore, the diameter of the reformer becomes larger and at the same time the reforming apparatus as a whole becomes complicated, thus contributing to an increased size thereof.

Also, in the conventional reformer, the combustion exhaust gas flows inside the reformer only. Hence, there is still room for further improvement in thermal efficiency.

Also, in view of the reforming efficiency in generating the hydrogen, which is a fuel for a fuel cell, from the raw fuel such as the utility gas, it is required that more of the heat of the combustion exhaust gas or reformed gas be used inside the reformer for the generation of steam or the reaction in the reformer.

Also, in the conventional reformer, the catalyst required for the reforming reaction or the reduction of carbon monoxide is placed at a desired position of the reforming reaction unit. However, in the aforementioned reformer, the passage for the reformed gas is still complicated and, at the same time, different catalysts need to be placed in a plurality of passages. Hence, the process of operation is cumbersome and complicated, thus causing a cost increase in manufacturing the apparatus.

Also, if a desulfurizing function is to be added to such a reformer as the above, the structure thereof will be further complicated.

A conventional reformer is a desulfurizing device employing a so-called hydrodesulfuruization (HDS) method (hereinafter referred to as "hydrogenation sulfurization method" also) where the raw fuel containing impurities such as sulfur is reacted with hydrogen in the presence of catalyst so as to remove sulfur components. Accordingly, some way to supply the hydrogen to the desulfurizing device must be adopted.

SUMMARY OF THE INVENTION

The present invention has been made under such circumstances, and an advantage of embodiments of the present invention is to provide a reforming apparatus, for use in a fuel cell, having a simplified structure.

Another advantage thereof is to provide a technology by which to improve the thermal efficiency in a fuel cell reforming apparatus.

Still another advantage thereof is to provide a technology for improving the reforming efficiency in a fuel cell reforming apparatus.

Still another advantage thereof is to provide a reforming apparatus, for use in a fuel cell, capable of being manufactured with ease.

Still another advantage thereof is to provide a fuel cell reforming apparatus of a simplified structure having a desulfurizer.

In order to resolve the foregoing problems, a reforming apparatus, for use in a fuel cell, according to one embodiment of the present invention reforms a raw fuel into a hydrogen-rich reformed gas, and the apparatus comprises: a reformer which generates the reformed gas from the raw fuel and steam; a shift reactor which reduces carbon monoxide contained in the reformed gas through water-gas shift reaction; a selective oxidation unit which reduces the carbon monoxide contained in the reformed gas that has passed through the shift reactor by performing selective oxidation on the carbon monoxide; a reforming reaction tube which houses linearly the reformer, the shift reactor and the selective oxidation unit in this order; a combustion means which produces combustion exhaust gas by combusting the raw fuel; and an outer casing, disposed around the reforming reaction tube, having a larger diameter than that of the reforming reaction tube. A heated flow passage through which the combustion exhaust gas passes to heat the reforming reaction tube is formed between the reforming reaction tube and the outer casing.

By employing this embodiment, the reformer, the shift reactor and the selective oxidation unit are housed in a single reforming reaction tube in this order. Hence, carbon monoxide contained in the reformed gas can be reduced without the formation of an intricately-shaped passage. Also, the combustion exhaust gas passes through the heated flow passage provided between the reforming reaction tube and the outer casing. As a result, the heat required for the reforming reaction within the reforming reaction tube can be supplied and therefore a heating means is no longer necessary. Also, a space between the reforming reaction tube and the outer casing serves as the heated flow passage. As a result, a passage requiring folded-back portions or many tubes is eliminated, so that the fuel cell reforming apparatus can be realized with a simple structure.

In order to resolve the foregoing problems, a reforming apparatus, for use in a fuel cell, according to another embodiment of the present invention reforms a raw fuel into a hydrogen-rich reformed gas, and the apparatus comprises: a reformer which generates the reformed gas from the raw fuel; a shift reactor which reduces carbon monoxide contained in the reformed gas through a shift reaction; a selective oxidation unit which reduces the carbon monoxide contained in the reformed gas that has passed through the shift reactor by performing selective oxidation on the carbon monoxide; a reforming reaction tube which houses linearly the reformer, the shift reactor and the selective oxidation unit in this order and which has a recessed area at a one-end side thereof where the reformer is housed; an outer casing, disposed around the reforming reaction tube, having a larger diameter than that of the reforming reaction tube; a combustion means, disposed counter to the recessed area, which produces combustion exhaust gas by combusting the raw fuel; and a heated flow passage through which the combustion exhaust gas passes, heating a recessed area side and an outer casing side of the reformer provided around the recessed area.

By employing this embodiment, the recessed area side and the outer casing side of the reformer are heated by the combustion exhaust gas passing through the heated flow passage. As a result, the heat required by the reformer is supplied efficiently.

In order to resolve the foregoing problems, a reforming apparatus, for use in a fuel cell, according to still another embodiment of the present invention reforms a raw fuel into a hydrogen-rich reformed gas, and the apparatus comprises: a reformer which generates the reformed gas from the raw fuel; a shift reactor which reduces carbon monoxide contained in the reformed gas through a shift reaction; a selective oxidation unit which reduces the carbon monoxide contained in the reformed gas that has passed through the shift reactor by performing selective oxidation on the carbon monoxide; a reforming reaction tube which houses linearly the reformer, the shift reactor and the selective oxidation unit in this order; a combustion means, placed in a fuel chamber formed at an end of a reformer side of the reforming reaction tube, which produces combustion exhaust gas by combusting the raw fuel; an outer casing, disposed around the reforming reaction tube, having a larger diameter than that of the reforming reaction tube; a heated flow passage, formed between the reforming reaction tube and the outer casing, through which the combustion exhaust gas passes to heat the reforming reaction tube; and a steam supply passage provided such that water flows through the reforming reaction tube from a selective oxidation unit side toward a reformer side to supply steam to the reformer. The steam supply passage recovers heat from the reformed gas and evaporates water by the heat.

By employing this embodiment, the heat recovered from the reformed gas is used to evaporate the water to produce steam in the steam supply passage, so that the temperature of the reformed gas to be discharged externally from the fuel cell reforming apparatus can be lowered.

In order to resolve the foregoing problems, a reforming apparatus, for use in a fuel cell, according to still another embodiment of the present invention reforms a raw fuel into a hydrogen-rich reformed gas, and the apparatus comprises: a reformer which generates the reformed gas from the raw fuel; a shift reactor which reduces carbon monoxide contained in the reformed gas through a shift reaction; a selective oxidation unit which reduces the carbon monoxide contained in the reformed gas that has passed through the shift reactor by performing selective oxidation on the carbon monoxide; a reforming reaction tube which houses linearly the reformer, the shift reactor and the selective oxidation unit in this order; a combustion means which produces combustion exhaust gas by combusting the raw fuel; and an outer casing, disposed around the reforming reaction tube, having a larger diameter than that of the reforming reaction tube. The reforming reaction tube is arranged vertically such that a reformer side thereof is arranged at a lower position thereof and a selective oxidation unit side thereof is arranged at an upper position thereof, and at least one of the shift reactor and the selective oxidation unit includes: a divider member which divides the interior of the reforming reaction tube into an upper portion and a lower portion; and a catalyst supported by the divider member from below.

By employing this embodiment, the catalyst can be supported by the divider member from below. Thus the catalyst may be filled in an area surrounded by the divider member and the reforming reaction tube. As a result, the catalyst can be easily filled.

In order to resolve the foregoing problems, a reforming apparatus, for use in a fuel cell, according to still another embodiment of the present invention reforms a raw fuel into a hydrogen-rich reformed gas, and the apparatus comprises: a desulfurizer which removes a sulfur component from the raw fuel; a reformer which generates the reformed gas from the raw fuel whose sulfur component has been removed by the desulfurizer; a shift reactor which reduces carbon monoxide contained in the reformed gas through a shift reaction; a selective oxidation unit which reduces the carbon monoxide contained in the reformed gas that has passed through the shift reactor by performing selective oxidation on the carbon monoxide; a reforming reaction tube which houses linearly the reformer, the shift reactor and the selective oxidation unit in this order and which further houses the desulfurizer; a combustion means which produces combustion exhaust gas by combusting the raw fuel; an outer casing, disposed around the reforming reaction tube, having a larger diameter than that of the reforming reaction tube; and a heated flow passage, formed between the reforming reaction tube and the outer casing, through which the combustion exhaust gas passes to heat the reforming reaction tube.

By employing this embodiment, the reformer, the shift reactor and the selective oxidation unit are all housed in a single reforming reaction tube in this order. Further, the desulfurizer is also housed therein. Hence, carbon monoxide contained in the reformed gas can be reduced without the formation of an intricately-shaped passage, and the sulfur components can also be removed.

In order to resolve the foregoing problems, a reforming apparatus, for use in a fuel cell, according to still another embodiment of the present invention reforms a raw fuel into a hydrogen-rich reformed gas, and the apparatus comprises: a reformer which generates the reformed gas from the raw fuel; a shift reactor which reduces carbon monoxide contained in the reformed gas through a shift reaction; a selective oxidation unit which reduces the carbon monoxide contained in the reformed gas that has passed through the shift reactor by performing selective oxidation on the carbon monoxide; a reforming reaction tube which houses linearly the reformer, the shift reactor and the selective oxidation unit in this order and which further houses a desulfurizer; a combustion means which produces combustion exhaust gas by combusting the raw fuel; an outer casing, disposed around the reforming reaction tube, having a larger diameter than that of the reforming reaction tube; a heated flow passage, formed between the reforming reaction tube and the outer casing, through which the combustion exhaust gas passes to heat the reforming reaction tube; a steam supply passage which supplies steam therethrough to the reformer wherein water is evaporated by heat of the combustion exhaust gas; and a raw fuel supply passage which passes through inside the reforming reaction tube, wherein the desulfurizer is connected along the raw fuel supply passage, and which supplies a heated raw fuel therethrough to the reformer wherein the temperature of the raw fuel is raised by heat of the combustion exhaust gas; and a reformed gas return passage which returns part of the reformed gas produced in the reformer to the desulfurizer wherein the reformed gas return passage is connected upstream of the desulfurizer connected along the raw fuel supply passage. The desulfurizer contains a hydrosulfurization catalyst to remove sulfur from the raw fuel by a reaction with hydrogen.

By employing this embodiment, the hydrogen required for the desulfurization is extracted from the reformed gas, so that a fuel cell reforming apparatus of a simplified structure having a desulfurizer can be realized.

It is to be noted that any arbitrary combinations or rearrangement, as appropriate, of the aforementioned constituting elements and so forth are all effective as and encompassed by the embodiments of the present invention.

Moreover, this summary of the invention does not necessarily describe all necessary features so that the invention may also be sub-combination of these described features.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

Figure 1:
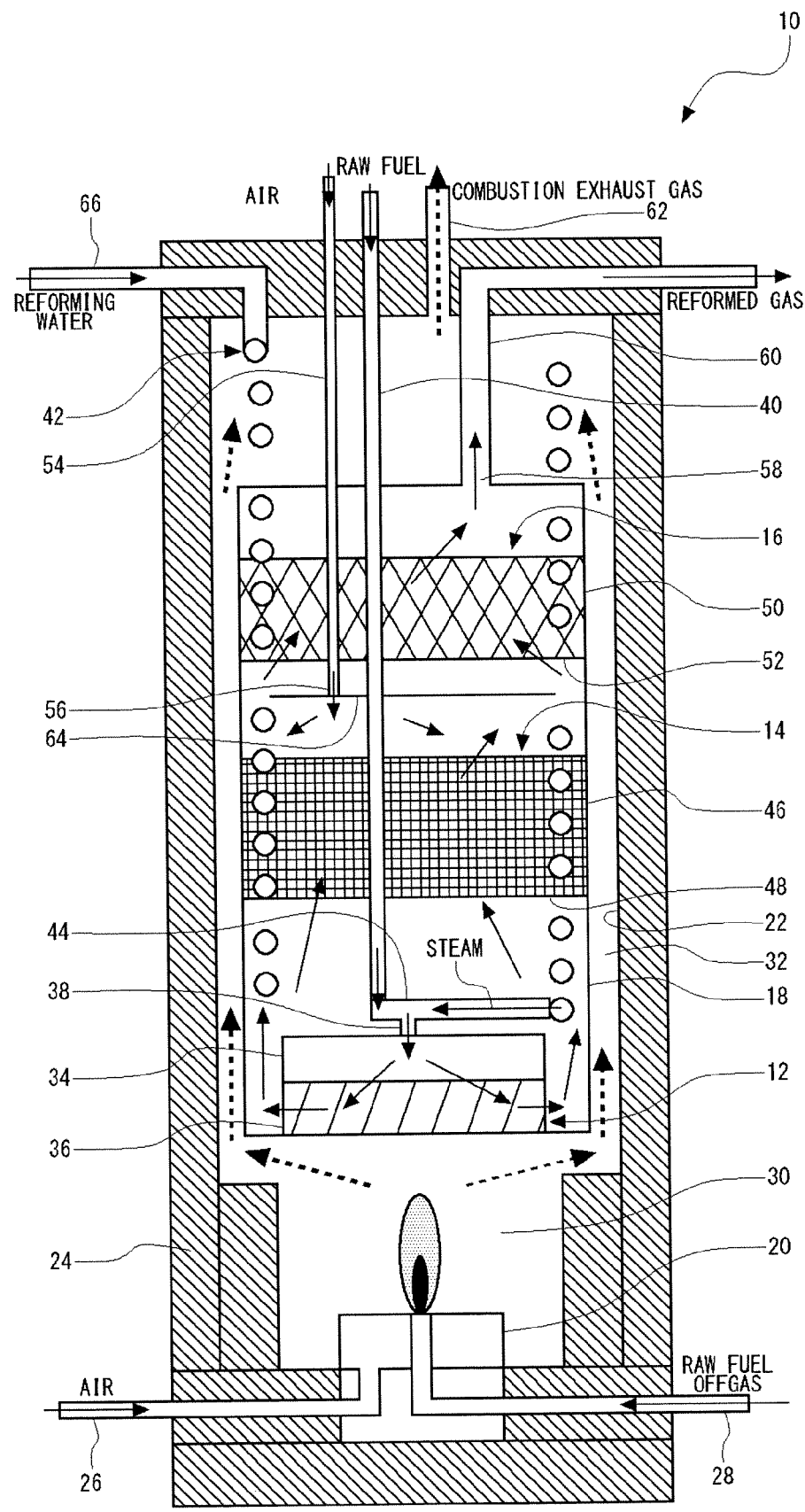
FIG. 1 is a cross-sectional view illustrating a structure of a reforming apparatus for use in a fuel cell according to a first embodiment of the present invention.

The invention will now be described by reference to the preferred embodiments. This does not intend to limit the scope of the present invention, but to exemplify the invention.

The best modes of carrying out the present invention will now be described in detail with reference to drawings. Note that in all of the Figures the same components are given the same reference numerals and the repeated description thereof is omitted as appropriate. For convenience of explanation, the positional relation between each component or member is explained in response to the horizontal and vertical direction in the Figures. However, such a positional relationship is a relative one and is not limited thereto. For instance, one embodiment may be such that the top and bottom position is reversed.

First Embodiment

FIG. 1 is a cross-sectional view illustrating a structure of a reforming apparatus 10 for use in a fuel cell according to a first embodiment of the present invention. The fuel cell reforming apparatus 10 produces hydrogen-rich reformed gas by subjecting methane, propane, butane or the like, which is a raw fuel, to steam reforming.

The fuel cell reforming apparatus 10 includes a reformer 12 for producing the reformed gas from the raw fuel and steam, a shift reactor 14 for reducing the carbon monoxide contained in the reformed gas through water-gas shift reaction, a selective oxidation unit 16 for reducing the carbon monoxide contained in the reformed gas which has passed through the shift reactor 14 by performing selective oxidation on said carbon monoxide through a selective oxidation reaction, a reforming reaction tube 18 for housing linearly the reformer 12, the shift reactor 14 and the selective oxidation unit 16 in this order, a burner 20, as a combustion means, for generating combustion exhaust gas by combusting the raw fuel, an outer casing 22, disposed coaxially around the reforming reaction tube 18, having a larger diameter than that of the reforming reaction tube 18. The periphery of the outer casing 22 is covered with a heat insulating material 24 except for portions where a plurality of pipings communicate with the exterior.

In the burner 20, the air introduced from an air inlet 26 and the raw fuel offgas introduced from a fuel inlet 28 are mixed together so as to be combusted. The combustion of the raw fuel gas by the burner 20 produces the high-temperature combustion exhaust gas of 1200 to 1300° C. The burner 20 is placed in a combustion chamber 30 which is formed at one end of the reformer 12 side of the reforming reaction tube 18 and is fixed to a lower part of the outer casing 22. As a result, the combustion exhaust gas produced in the burner 20 can be immediately used for the reforming reaction in the reformer 12. Thus the thermal efficiency can be enhanced.

A heated flow passage 32 is formed between the reforming reaction tube 18 and the outer casing 22. The aforementioned combustion exhaust gas passes through the heated flow passage 32 to heat the reforming reaction tube 18.

The reformer 12 includes a casing 34, provided on the bottom of the reforming reaction tube 18, whose outside diameter is smaller than that of the reforming reaction tube 18, and a catalyst layer 36 containing a reforming catalyst where metal particles such as nickel or ruthenium are supported on alumina, the catalyst layer 36 also being housed on a lower side of the casing 34. An opening 38 is formed on the top surface of the casing 34; and the raw fuel and the steam flow into the opening 38 with the raw fuel and the steam being mixed together. The casing 34 has ventilation holes provided on the side surfaces so that the reformed gas can pass through the side surfaces of the catalyst layer 36.

The raw fuel is supplied from the exterior of the fuel cell reforming apparatus 10 to the catalyst layer 36 in the reformer 12 via a raw fuel supply passage 40 that penetrates the reforming reaction tube 18, the outer casing 22 and the heat insulating material 24. While the raw fuel is being supplied to the catalyst layer 36, the temperature of the raw fuel is raised by the combustion exhaust gas flowing through the heated flow passage 32 or reformed gas inside the reforming reaction tube 18 and, at the same time, the temperature of the reformed gas is lowered thereby.

The steam required for the reforming reaction in the reformer 12 is generated from the reforming water supplied from the exterior of the fuel cell reforming apparatus 10 via a steam supply passage 42. The reforming water, which is a liquid supplied externally, is evaporated by the heat recovery between the combustion exhaust gas and the reformed gas heated inside the reforming reaction tube 18 and is then supplied to the catalyst layer 36 as steam. The reforming water lowers the temperature of the shift reactor 14 or the selective oxidation unit 16.

In the fuel cell reforming apparatus 10 according to the first embodiment, the raw fuel supply passage 40 joins together with the steam supply passage 42 at a merging part 44 disposed downstream of a position where the water passing through the steam supply passage 42 is evaporated. Inside the outer casing 22 or the reforming reaction tube 18, part of the steam supply passage 42 is of a spirally-wound coil shape. Also, as the surface area of the steam supply passage 42 becomes larger, the water is more likely to be evaporated. Hence, the steam is produced at least at a lower end of a coil upstream of the merging part 44.

As with the fuel cell reforming apparatus 10 according to the first embodiment, the raw fuel and the steam join together after the temperature of the raw fuel has risen, due to the combustion exhaust gas heated, in the raw fuel supply passage 40 and after the water has been evaporated in the steam supply passage 42, separately. This makes it easy to control the supply of steam as a result of the temperature rise of the raw fuel or the evaporation of water in each supply passage.

The shift reactor 14 includes a catalyst layer 46 comprised of pellets made of copper oxide or zinc oxide, for instance, and a divider plate 48 where holes are so formed as to support the catalyst layer 46 and transmit the reformed gas from below to above. The shift reactor 14 can reduce the carbon monoxide by a shift reaction, using the steam contained in the reformed gas, due to the activity of the catalyst layer 46.

The selective oxidation unit 16 includes a catalyst layer 50, comprised of carbon monoxide selective oxidation catalyst, supported on alumina, for instance, and a divider plate 52 where holes are so formed as to support the catalyst layer 50 and transmit the reformed gas from below to above. In the selective oxidation unit 16, the carbon monoxide is combined with oxygen and converted into carbon dioxide through the activity of the catalyst layer 50 and therefore the concentration of carbon monoxide is further reduced.

In an area between the shift reactor 14 and the selective oxidation unit 16 there is disposed a tip part 56 of an air supply passage 54 that communicates with the exterior of the fuel cell reforming apparatus 10 to supply the oxygen to be consumed in the selective oxidation unit 16. As a result, the air flowing through the tip part 56 rises together with the reformed gas whose carbon monoxide has been reduced in the shift reactor 14, thus contributing to the reaction in the selective oxidation unit 16.

An opening 58 is formed on the top surface of the reforming reaction tube 18 above the selective oxidation unit 16. A reformed gas supply pipe 60 is connected to the opening 58. The reformed gas supply pipe 60 delivers the reformed gas whose carbon monoxide concentration has been sufficiently reduced, to a fuel electrode of a fuel cell (not shown).

An operation of the fuel cell reforming apparatus 10 according to the first embodiment is now described. The combustion exhaust gas produced in the burner 20 heats up the underside of the reforming reaction tube 18 and then heats up the side surface thereof as the combustion exhaust gas rises up the heated flow passage 32. At this time, the catalyst layer 36 is heated to a temperature range of 600 to 700° C., for instance, required for the reforming reaction, via the reforming reaction tube 18. Also, the steam supply passage 42 is directly heated or indirectly heated by the combustion exhaust gas via the reformed reaction tube 18, so that the reforming water passing through inside thereof is evaporated. At the same time, as the combustion exhaust gas rises up the heated flow passage 32, the combustion exhaust gas is cooled by the steam supply passage 42 and the temperature thereof drops gradually. It is to be noted here that the combustion exhaust gas having passed through the heated flow passage 32 is discharged to the exterior through an exhaust outlet 62 provided on top of the outer casing 22.

The steam evaporated in the steam supply passage 42 and the raw fuel heated in the raw fuel supply passage 40 are mixed at the merging part 44 and then sent into the casing 34 on a lower side thereof. The raw fuel gas containing the steam is gradually heated by the heat of the combustion exhaust gas when passing through inside the catalyst layer 36 and is changed into a hydrogen-rich reformed gas through a reforming reaction.

The reformed gas produced by reforming the raw fuel gas rises up in the reforming reaction tube 18 with the flow of the raw fuel gas supplied, and reaches the shift reactor 14. Here, since the reforming reaction in the reformer 12 is an endothermic reaction, the reformed gas whose temperature has dropped due to the heat recovery formed in the steam supply passage 42 reaches the shift reactor 14. The shift reaction in the shift reactor 14 is carried out in the range of 200 to 300° C., for instance, and the heat balance is achieved by the heat recovery in the steam supply passage 42. Thus, an appropriate temperature can be maintained without performing any particular temperature control. As a result, the carbon monoxide in the reformed gas can be reduced in the shift reactor 14.

If the temperature in the shift reactor 14 does not become the appropriate temperature, the temperature can be adjusted by adjusting the fuel quantity of the raw fuel in the burner 20 or varying the number of turns of the spiral-shaped steam supply passage 42 in the vicinity of the shift reactor 14.

While the flow through the interior of the reforming reaction tube 18 is being regulated by a current plate 64, the reformed gas whose carbon monoxide has been reduced in the shift reactor 14 rises up further with the flow of the raw fuel gas supplied and then reaches the selective oxidation unit 16. At this time, the air supplied from the air supply passage 54 also rises up in the reforming reaction tube 18 and then reaches the selective oxidation unit 16.

The selective oxidation unit 16 is disposed near an inlet 66 of the steam supply passage 42, so that the temperature of the reformed gas is lower than that in the shift reactor 14 because the reformed gas has been cooled by the reforming water. The selective oxidation reaction in the selective oxidation unit 16 is carried out in the range of 70 to 200° C., for instance, which is lower than the temperature at which the shift reaction is carried out in the shift reactor 14, and the heat balance is achieved by the heat recovery in the steam supply passage 42. Thus, the reformed gas can be maintained at an appropriate temperature without performing any particular temperature control. As a result, the carbon monoxide in the reformed gas is further reduced in the selective oxidation unit 16.

As described above, the fuel cell reforming apparatus 10 is structured such that the reformer 12, the shift reactor 14 and the selective oxidation unit 16 are housed in a single reforming reaction tube 18 in this order. Hence, carbon monoxide contained in the reformed gas can be reduced without the formation of an intricately-shaped passage. Also, the combustion exhaust gas passes through the heated flow passage 32 provided between the reforming reaction tube 18 and the outer casing 22. As a result, the heat required for the reforming reaction in the reformer 12 within the reforming reaction tube 18 can be supplied and therefore a heating means such as a heater is no longer necessary. Also, a space between the reforming reaction tube 18 and the outer casing 22 serves as the heated flow passage 32. As a result, a passage requiring a many-folded structure with folded-back portions or many tubes is eliminated, so that the fuel cell reforming apparatus 10 can be realized with a simple structure.

In other words, the passage requiring folded-back portions or many cylindrical structures is eliminated in the fuel cell reforming apparatus 10 according to the first embodiment. As a result, the number of parts required is reduced and the manufacturing process is simplified, thus reducing the overall cost. Also, the periphery of the outer casing 22 is covered with the heat insulating material 24, thus easily securing excellent heat insulating property. Hence, the process necessary for mounting the heat insulating material 24 can be simplified.

Further, the heated flow passage 32 is formed in a manner such that the combustion exhaust gas passes through from a reformer 12 side toward a selective oxidation unit 16 side. As a result, while heat-exchanging with the reforming reaction tube 18 or the steam supply passage 42, the combustion exhaust gas gradually drops its temperature. Thus, the combustion exhaust gas passes through inside the heated flow passage 32 from the reformer 12 with a high reaction temperature toward the selective oxidation unit 16 with a low reaction temperature while the temperature thereof drops appropriately. This enables forming the heated flow passage 32 in a linear manner.

Second Embodiment

Figure 2:
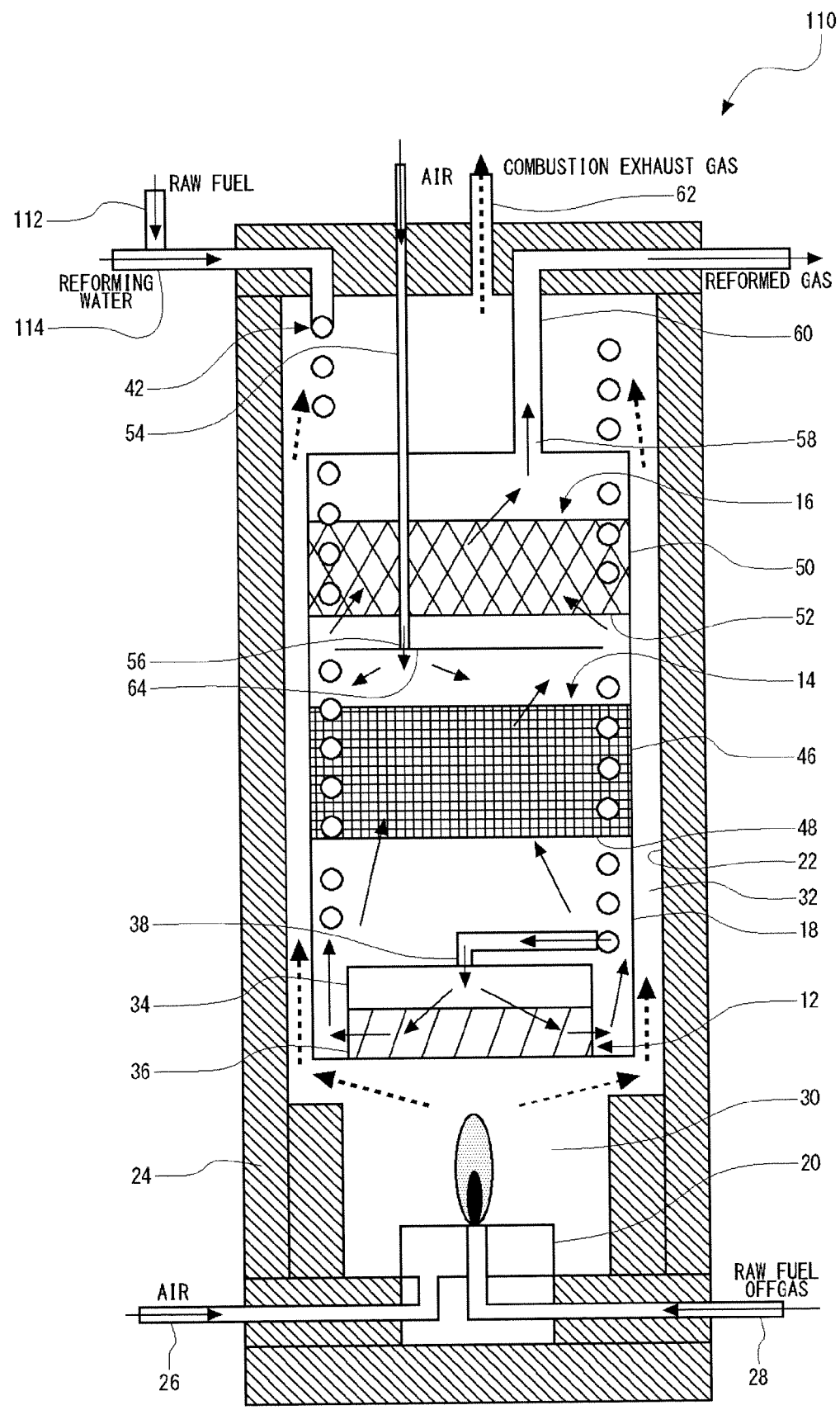
FIG. 2 is a cross-sectional view illustrating a structure of a reforming apparatus for use in a fuel cell according to a second embodiment of the present invention.

FIG. 2 is a cross-sectional view illustrating a structure of a reforming apparatus 110 for use in a fuel cell according to a second embodiment of the present invention. The fuel cell reforming apparatus 110 according to the second embodiment includes a steam supply passage 42 in which the water is evaporated by the heating of combustion exhaust gas to supply the steam to a reformer 12, and a raw fuel supply passage 112 for supplying the raw fuel to the reformer 12. The raw fuel supply passage 112 joins together with the steam supply passage 42 at a merging part 114 disposed upstream of a position where the water passing through the steam supply passage 42 is evaporated. With this structure, the temperature of the raw fuel is raised as a result of the heating by the combustion exhaust gas, and simultaneously the water is evaporated in the steam supply passage 42. Hence, the length of the raw fuel supply passage 112 can be made shorter.

The raw fuel passage 112 joins together with the steam supply passage 42 at an area outside the reforming reaction tube 18. As a result, it is no longer required to provide the raw fuel supply passage 112, in the reforming reaction tube 18, separately from the steam supply passage 42. In other words, the raw fuel supply passage 112 is omitted here. Hence, the reforming reaction tube 18 or the fuel cell reforming apparatus 110 including the reforming reaction tube 18 can be easily manufactured.

Third Embodiment

In the fuel cell reforming apparatus according to each of the above-described embodiments, the steam supply passage 42 is so provided that it passes through inside the reforming reaction tube 18 and it penetrates the catalyst layer 46 in the shift reactor 14 and the catalyst layer 50 in the selective oxidation unit 16. Accordingly, the catalyst temperature drops more than necessary in an area of the steam supply passage 42 directly contacted by the catalyst layer 50. Thus, there is a possibility that the reaction does not progress sufficiently. In the light of this, the arrangement of the steam supply passage is devised in this third embodiment, thus preventing the temperature of the catalyst layer from dropping more than necessary.

Figure 3:
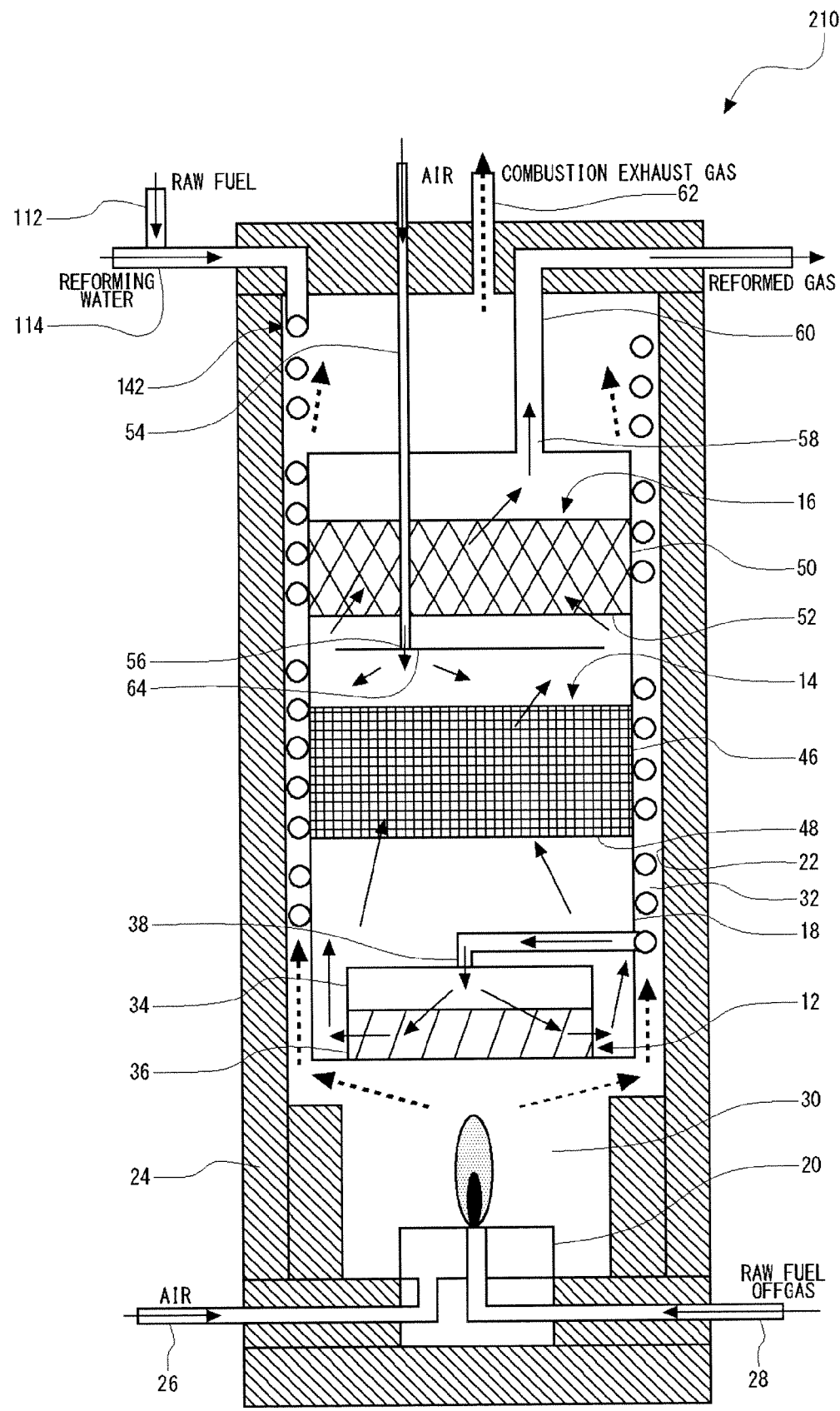
FIG. 3 is a cross-sectional view illustrating a structure of a reforming apparatus for use in a fuel cell according to a third embodiment of the present invention.

FIG. 3 is a cross-sectional view illustrating a structure of a reforming apparatus 210 for use in a fuel cell according to a third embodiment of the present invention. The fuel cell reforming apparatus 210 according to the third embodiment differs greatly from the fuel cell reforming apparatus 10 according to the first embodiment in that a steam supply passage 142 is provided inside a heated flow passage 32. With this structure, the catalyst layer 46 in the shift reactor 14 and the catalyst layer 50 in the selective oxidation unit 16 are indirectly cooled by the steam supply passage 142 through the reforming reaction tube 18. Hence, this structure and operation prevent the temperature of part of each catalyst layer from dropping excessively. As a result, for instance, the structure realized by the third embodiment prevents the state that carbon monoxide does not react sufficiently in the selective oxidation unit 16 and the unreacted carbon monoxide is supplied to the fuel electrode of a fuel cell. The steam supply passage 142 may be so provided as to come in contact with the reforming reaction tube 18. In such a case, not only the heat recovery from the combustion exhaust gas but also the reaction heat in the catalyst layers 46 and 50 is recovered more, and the catalyst layers 46 and 50 can be cooled more. The reformed gas in the reforming reaction tube 18 can also be cooled more.

Fourth Embodiment

In the fuel cell reforming apparatus according to each of the above-described embodiments, both the shift reactor 14 and the catalyst layer 46 are of cylindrical shape. Thus, if the diameter of each catalyst layer gets larger, the heat of the central part of the catalyst layer may not be removed sufficiently. In such a case, the central part of the catalyst layer rises to and is kept at high temperatures and it becomes difficult to achieve normal and efficient reaction. In particular, if the steam supply passage 142 is disposed outside the reforming reaction tube 18 as with the fuel cell reforming apparatus 210 according to the third embodiment, there is a strong possibility that the heat is not removed sufficiently. Accordingly, if the temperature of the catalyst layer 50 in the selective oxidation unit 16 exceeds an appropriate temperature, a side reaction where the hydrogen in the reformed gas is oxidized may take place.

Figure 4:
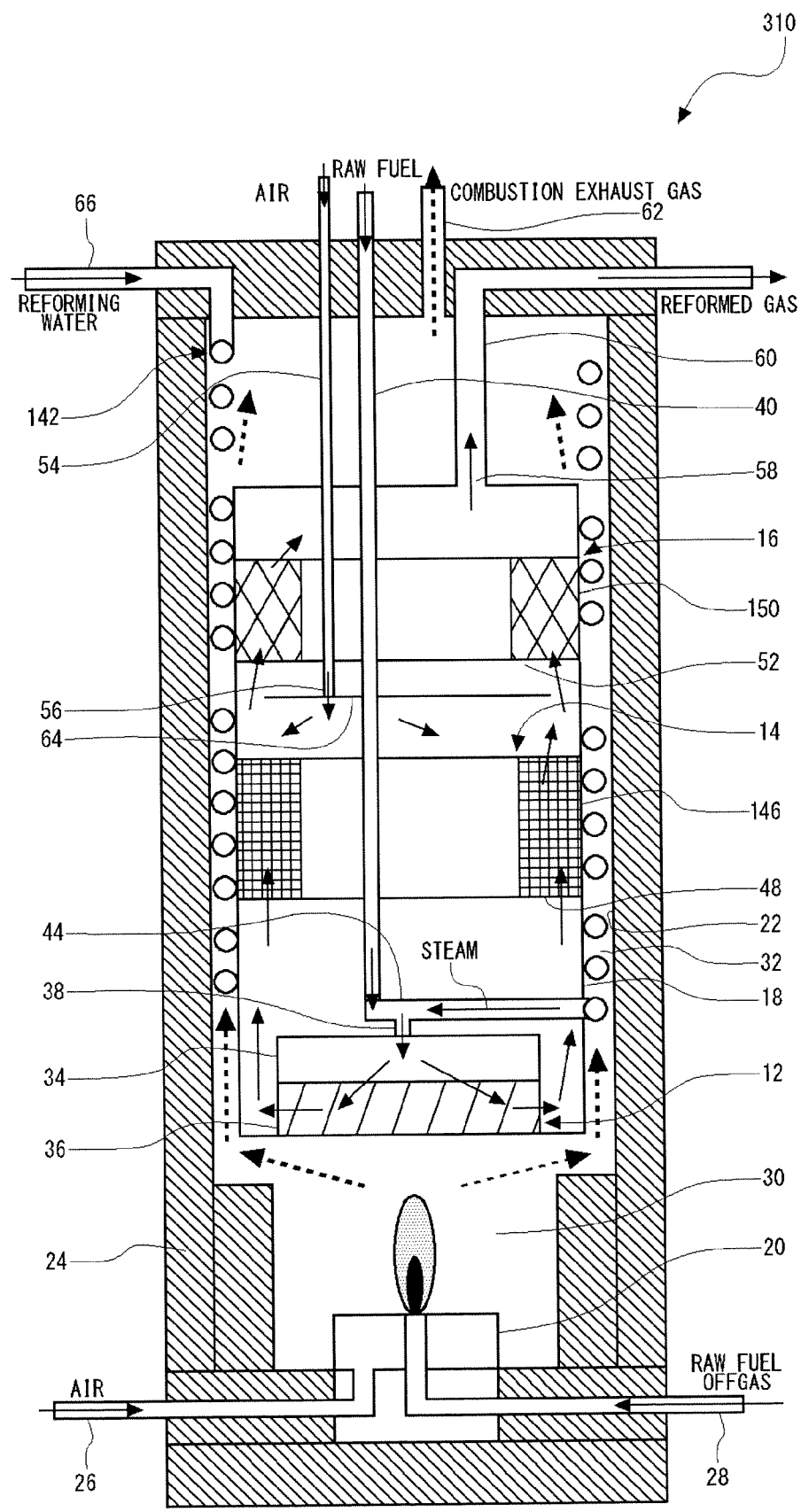
FIG. 4 is a cross-sectional view illustrating a structure of a reforming apparatus for use in a fuel cell according to a fourth embodiment of the present invention.

FIG. 4 is a cross-sectional view illustrating a structure of a reforming apparatus 310 for use in a fuel cell according to a fourth embodiment of the present invention. Both the catalyst layer 146 in the shift reactor 14 and the catalyst layer 150 in the selective oxidation unit 16 are formed in ring shapes in the fuel cell reforming apparatus 310. As a result, each catalyst layer is structured such that the central part where it is hard to appropriately control the temperature range is hollowed. Thus, the occurrence of undesired side reaction is prevented.

Fifth Embodiment

Figure 5:
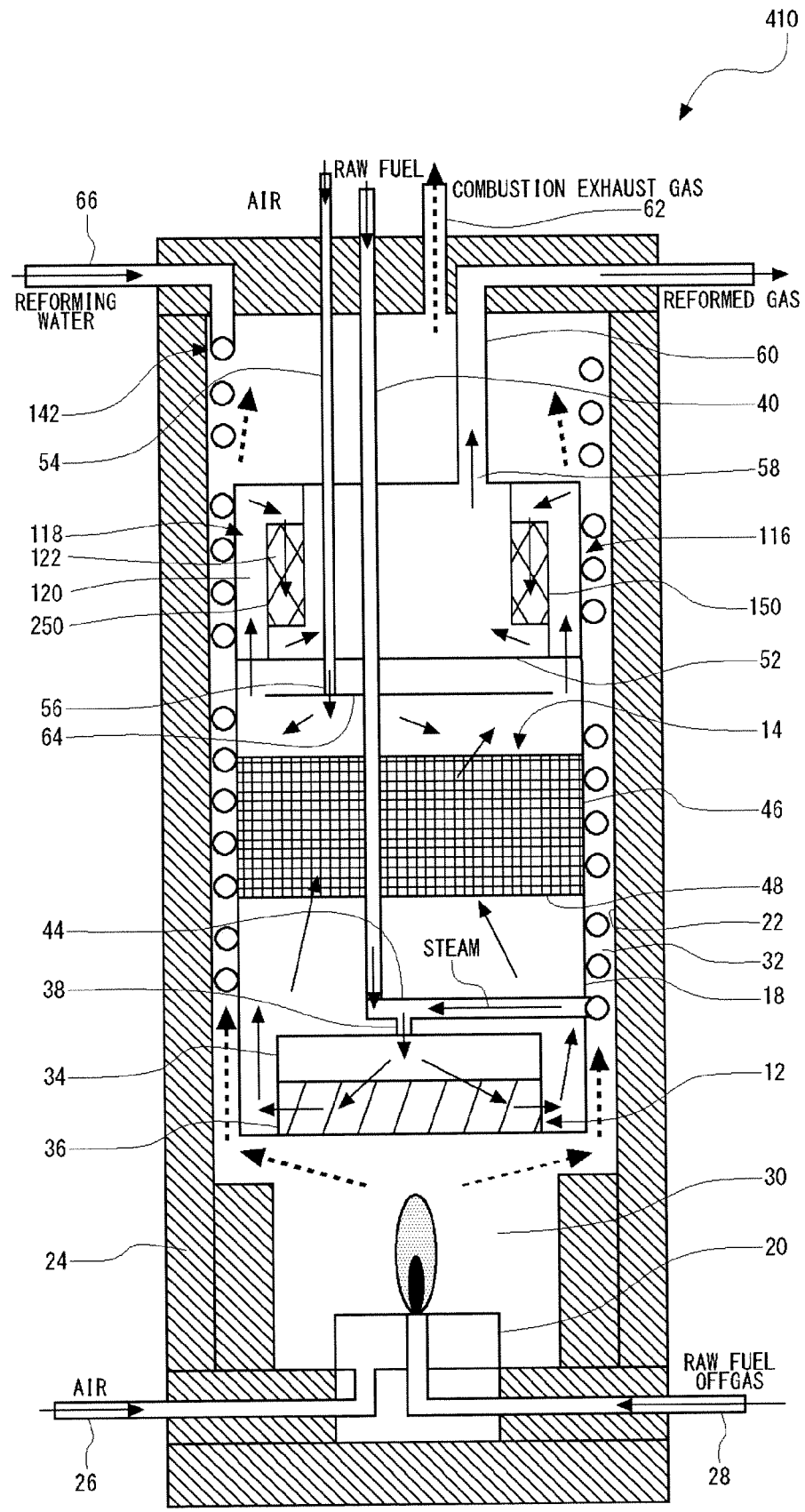
FIG. 5 is a cross-sectional view illustrating a structure of a reforming apparatus for use in a fuel cell according to a fifth embodiment of the present invention.

FIG. 5 is a cross-sectional view illustrating a structure of a reforming apparatus 410 for use in a fuel cell according to a fifth embodiment of the present invention. As described earlier, the catalytic reaction in the selective oxidation unit needs to be carried out in an appropriate temperature range. Normally, the reaction is most active in an inlet side where the reformed gas flows in, so that the temperature of the catalyst layer tends to be high in an inlet side and it tends to be low in an outlet side. Consequently, if the temperature of the reformed gas flowing into the catalyst layer of the selective oxidation is too high, the reaction temperature near the inlet of the catalyst layer may be high enough to exceed the appropriate temperature range.

In the light of this, a selective oxidation unit 116 in the fuel cell reforming apparatus 410 includes a folded-back passage 118 and a ring-shaped catalyst layer 250 provided in the folded-back passage 118. The folded-back passage 118 is comprised of a first passage 120 and a second passage 122. In the first passage 120, the reformed gas having passed through the shift reactor 14 flows toward the opposite side of a combustion chamber 30 side along the inner wall of the reforming reaction tube 18. The second passage 122 is folded back on the inside so that the reformed gas having passed through the first passage 120 travels toward the combustion chamber 30 side. The catalyst layer 250 is provided in the second passage 122.

By employing the structure according to the fifth embodiment, before the reformed gas reaches the inlet side of the catalyst layer 250, the heat of the reformed gas is removed, in the first passage 120, by the low-temperature reformed water flowing through the steam supply passage 142 disposed around the first passage 120. Accordingly, the reaction temperature in the inlet side of the catalyst layer 250 can be reduced to the appropriate temperature range. The steam supply passage 142 may be so provided as to come in contact with the first passage 120. As a result, the temperature of the reformed gas flowing into the inlet side of the catalyst layer 250 can be further reduced.

Since the first passage 120 and the second passage 122 are arranged side by side, it is also possible to recover the reaction heat in the catalyst layer 250 through the reformed gas. In the second passage 122, the reformed gas flows through the catalyst layer 250 toward the fuel chamber 30 side. Thus, even if the reaction heat in the outlet side of the catalyst layer 250 is small, the drop in temperature can be suppressed by the reformed gas flowing into the first passage 120. As a result, the drop in reaction temperature in the outlet side is suppressed wherein, in the catalyst layer 250, the reaction temperature in the outlet side tends to be lower than that in the inlet side. Hence, the catalyst layer 250 as a whole is kept in a temperature range appropriate for the catalytic reaction.

Here, the reaction temperature of the catalyst layer 250 may be kept in the range of 100 to 200° C. The reaction temperature thereof is preferably kept in the range of 120 to 180° C. More preferably, the reaction temperature thereof is kept in the range of 130 to 170° C. The reaction does not progress sufficiently in an area the temperature of which is too low. An unnecessary side reaction takes place first in an area the temperature of which is too high.

According to this fifth embodiment, the provision of the folded-back passage 118 makes it possible to have the inlet side of the catalyst layer 250 in the selective oxidation unit 16 arranged on a side away from the shift reactor 14 in the selective oxidation unit 16. Thus, the distance that the reformed gas, having practically passed through the shift reactor 14, travels until it reaches the catalyst layer 250 in the selective oxidation unit 16 is made longer. In other words, the travelling distance of the reformed gas is made longer without making the distance between the shift reactor 14 and the selective oxidation unit 16 longer, namely, without extending the reforming reaction tube 18 in the longitudinal direction. Thus the temperature of the reformed gas that has reached the inlet side of the catalyst layer 250 can be reduced. As a result, the fuel cell reforming apparatus 410 can be made compact in the longitudinal direction thereof.

Sixth Embodiment

Figure 6:
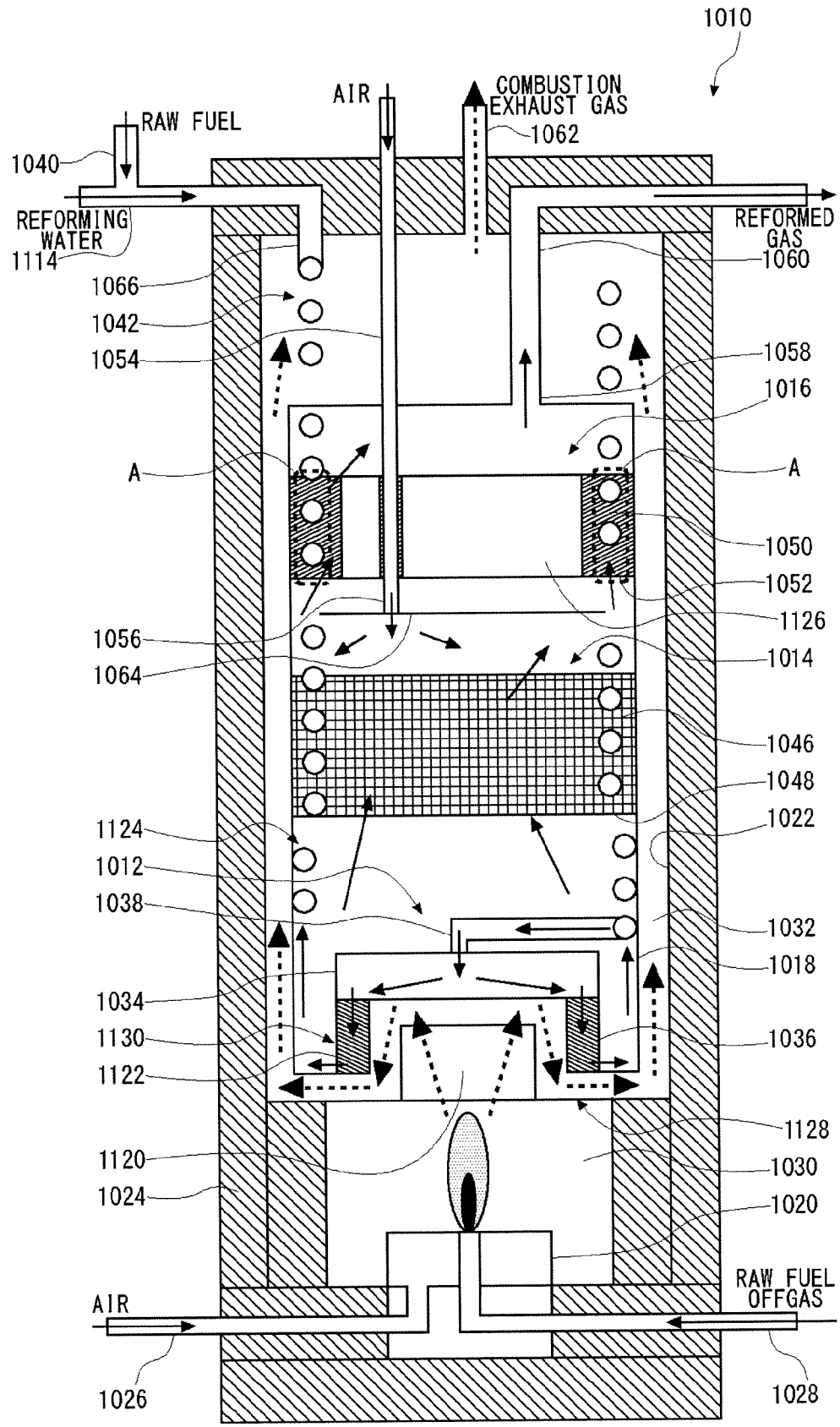
FIG. 6 is a cross-sectional view illustrating a structure of a reforming apparatus for use in a fuel cell according to a sixth embodiment of the present invention.

FIG. 6 is a cross-sectional view illustrating a structure of a reforming apparatus 1010 for use in a fuel cell according to a sixth embodiment of the present invention. The fuel cell reforming apparatus 1010 produces hydrogen-rich reformed gas by subjecting the raw fuel, such as methane, propane and butane, to steam reforming.

The fuel cell reforming apparatus 1010 includes a reformer 1012 for producing the reformed gas from the raw fuel, a shift reactor 1014 for reducing the carbon monoxide contained in the reformed gas through a shift reaction, a selective oxidation unit 1016 for reducing the carbon monoxide contained in the reformed gas which has passed through the shift reactor 1014 by performing selective oxidation on said carbon monoxide through a selective oxidation reaction, a reforming reaction tube 1018 which houses linearly the reformer 1012, the shift reactor 1014 and the selective oxidation unit 1016 in this order and in which a recessed area 1120 is formed at one-end side thereof where the reformer 1012 is housed, a burner 1020, as a combustion means, for generating combustion exhaust gas by combusting the raw fuel, and an outer casing 1022, disposed coaxially around the reforming reaction tube 1018, having a larger diameter than that of the reforming reaction tube 1018. The periphery of the outer casing 1022 is covered with a heat insulating material 1024 except for portions where a plurality of pipings communicate with the exterior.

In the burner 1020, the air introduced from an air inlet 1026 and the raw fuel offgas introduced from a fuel inlet 1028 are mixed together so as to be combusted. The combustion of the raw fuel gas by the burner 1020 produces the high-temperature combustion exhaust gas of 1200 to 1300° C. The burner 1020 is disposed in a combustion chamber 1030 which is disposed counter to the recessed area 1120 formed at one end of a reformer 1012 side of the reforming reaction tube 1018, and is fixed to a lower part of the outer casing 1022. As a result, the combustion exhaust gas produced in the burner 1020 can be immediately used for the reforming reaction in the reformer 1012. Thus the thermal efficiency can be enhanced.

A heated flow passage 1032, through which the aforementioned combustion exhaust gas passes to heat the reforming reaction tube 1018, is formed between the reforming reaction tube 1018 and the outer casing 1022.

The reformer 1012 includes a casing 1034, provided on the bottom of the reforming reaction tube 1018, whose outside diameter is smaller than that of the reforming reaction tube 1018, and a catalyst layer 1036 containing a reforming catalyst where metal particles such as nickel or ruthenium are supported on alumina, the catalyst layer 1036 also being housed on the inner periphery of the bottom part of the casing 1034. The catalyst layer 1036 according to the sixth embodiment is a annular member that surrounds the periphery of the recessed area 1120.

An opening 1038 is formed on the top surface of the casing 1034; and the raw fuel and the steam flow into the opening 1038 with the raw fuel and the steam being mixed together. The casing 1034 has ventilation holes 1122 provided on the side surfaces so that the reformed gas can pass through lower side surfaces of the catalyst layer 1036.

The raw fuel is supplied from the exterior of the fuel cell reforming apparatus 1010 to the catalyst layer 1036 in the reformer 1012 via a raw fuel supply passage 1040. While the raw fuel is being supplied to the catalyst layer 1036, the temperature of the raw fuel is raised by the combustion exhaust gas flowing through the heated flow passage 1032 or reformed gas inside the reforming reaction tube 1018 and, at the same time, the temperature of the reformed gas is lowered thereby.

The steam required for the reforming reaction in the reformer 1012 is generated from the reforming water supplied from the exterior of the fuel cell reforming apparatus 1010 via a steam supply passage 1042. The reforming water, which is a liquid supplied externally, is evaporated by the heat recovery between the combustion exhaust gas and the reformed gas heated inside the reforming reaction tube 1018 and is then supplied to the catalyst layer 1036 as steam. The reforming water lowers the temperature of the shift reactor 1014 or the selective oxidation unit 1016.

In the fuel cell reforming apparatus 1010 according to the sixth embodiment, the raw fuel supply passage 1040 joins together with the steam supply passage 1042 at a merging part 1114 disposed upstream of a position where the water passing through the steam supply passage 1042 is evaporated. Inside the outer casing 1022 and the reforming reaction tube 1018, part of the steam supply passage 1042 is of a spirally-wound coil shape. Also, as the surface area of the steam supply passage 1042 becomes larger, the water is more likely to be evaporated. Hence, the steam is produced at least at a lower end of a coil.

With this structure, the temperature of the raw fuel is raised as a result of the heating by the combustion exhaust gas, and simultaneously the water is evaporated in the steam supply passage 42. Hence, the length of the raw fuel supply passage 1040 can be shortened.

The raw fuel passage 1040 joins together with the steam supply unit 1042 at an area outside the reforming reaction tube 1018. As a result, it is no longer required to provide the raw fuel supply passage 1040, in the reforming reaction tube 1018, separately from the steam supply passage 1042. In other words, the raw fuel supply passage 1040 is omitted here. Hence, the reforming reaction tube 1018 or the fuel cell reforming apparatus 1010 including the reforming reaction tube 1018 can be easily manufactured.

The steam supply passage 1042 has a spiral passage 1124 so formed in a coil-like shape that at least part thereof comes in contact with an inner surface of the reforming reaction tube 1018. With this structure, the heat is efficiently supplied from the combustion exhaust gas passing through the heated flow passage 1032 provided outside the reforming reaction tube 1018, through the reforming reaction tube 1018. Thus, the water is likely to be evaporated into steam. In particular, by bringing the coil-shaped spiral passage 1124 into contact with the inner surface of the reforming reaction tube 1018, the contact area between the steam supply passage 1042 and the reforming reaction tube 1018 can be made larger without extending the length of the reforming reaction tube 1018. As a result, the heat transfer efficiency between the raw fuel or reforming water and the combustion exhaust gas can be enhanced.

The shift reactor 1014 includes a catalyst layer 1046 comprised of pellets made of copper oxide or zinc oxide, for instance, and a divider plate 1048 where holes are so formed as to support the catalyst layer 1046 and transmit the reformed gas from below to above. The shift reactor 1014 can reduce the carbon monoxide by the shift reaction, using the steam contained in the reformed gas, due to the activity of the catalyst layer 1046.

The selective oxidation unit 1016 includes a catalyst layer 1050, comprised of carbon monoxide selective oxidation catalyst, supported on alumina, for instance, and a divider plate 1052 where holes are so formed as to support the catalyst layer 1050 and transmit the reformed gas from below to above. In the selective oxidation unit 1016, the carbon monoxide is combined with oxygen and converted into carbon dioxide through the activity of the catalyst layer 1050 and therefore the concentration of carbon monoxide is further reduced.

The selective oxidation unit 1016 according to the sixth embodiment, a resistance member 1126 that gives resistance to the flow of reformed gas is provided in an area excluding an area A where the steam supply passage 1042 passes through. This makes it easy for the reformed gas heated by the combustion exhaust to flow toward the coil of the steam supply passage 1042 passing through the selective oxidation unit 1016, thus making it easy to supply the heat to the water or steam in the steam supply passage 1042. A material or member that shuts off completely the flow of reformed gas may be suitable as the resistance member 1126. With the provision of the resistance member 1126, the reformed gas is introduced into the catalyst layer 1050 of the selective oxidation unit 1016. Even though such a resistance member as described above is provided in the shift reactor 1014, the similar advantageous effects can be achieved.

In an area between the shift reactor 1014 and the selective oxidation unit 1016 there is disposed a tip part 1056 of an air supply passage 1054 that communicates with the exterior of the fuel cell reforming apparatus 1010 to supply the oxygen to be consumed in the selective oxidation unit 1016. As a result, the air flowing through the tip part 1056 rises together with the reformed gas whose carbon monoxide has been reduced in the shift reactor 1014, thus contributing to the reaction in the selective oxidation unit 1016.

An opening 1058 is formed on the top surface of the reforming reaction tube 1018 above the selective oxidation unit 1016. A reformed gas supply pipe 1060 is connected to the opening 1058. The reformed gas supply pipe 1060 delivers the reformed gas whose carbon monoxide concentration has been sufficiently reduced, to a fuel electrode of a fuel cell (not shown).

The heated flow passage 1032 according to the sixth embodiment has a folded-back portion 1128 at an inlet side thereof located above a burner 1020. The folded-back portion 1128 is folded back from within a recessed area 1120 toward the periphery side of the reformed reaction tube 1018 so that the combustion exhaust gas passes through the reformed reaction tube 1018 while heating a recessed area side and an outer casing side of the catalyst layer 1036 in the reformer 1012 provided around the recessed area 1120. Thus, the recessed area side and the outer casing side of the reformer 1012 are heated by the combustion exhaust gas passing through the heated flow passage 1032. As a result, the heat required by the reformer 1012 is supplied efficiently.

In the reformer 1012, the mixed gas of steam and raw fuel having flowed into a case 1034 from the opening 1038 passes down through the catalyst layer 1036 and is discharged from the ventilation holes 1122 as reformed gas. The discharged reformed gas flows upward through a space between the reforming reaction tube 1018 and the case 1034. That is, the reformer 1012 has a folded-back passage 1130 where the gas flows toward a fuel chamber 1030 side through within the catalyst layer 1036 along the side surface of the recessed area 1120 and it also flows toward a shift reactor 1014 side along the inner surface of the reforming reaction tube 1018.

An operation of the fuel cell reforming apparatus 1010 according to the sixth embodiment is now described. The combustion exhaust gas produced in the burner 1020 flows into the heated flow passage 1032 from the recessed area 1120 on the underside of the reforming reaction tube 1018, and changes the direction of flow thereof at the folded-back portion 1128 while the combustion exhaust gas is heating up the side surface of the catalyst layer 1036 on a recessed area 1120 side thereof. The combustion exhaust gas also heats up the outer casing side of the catalyst layer 1036 while rising along the heated flow passage 1032. At this time, the catalyst layer 1036 is heated to a temperature range of 600 to 700° C., for instance, required for the reforming reaction, via the reforming reaction tube 1018. Also, the steam supply passage 1042 is directly heated or indirectly heated by the combustion exhaust gas via the reformed reaction tube 1018, so that the reforming water passing through inside thereof is evaporated.

At the same time, as the combustion exhaust gas rises up the heated flow passage 1032, the combustion exhaust gas is cooled by the steam supply passage 1042 and the temperature thereof drops gradually. It is to be noted here that the combustion exhaust gas having passed through the heated flow passage 1032 is discharged to the exterior through an exhaust outlet 1062 provided on top of the outer casing 1022.

The raw fuel supply passage 1040 joins together with the steam supply passage 1042 at a merging part 1114. The reforming water and the raw fuel are mixed at the merging part 1114 and are sent into the casing 1034 on a lower side thereof while the mixture of the reforming water and the raw fuel is being evaporated and the temperature thereof is being raised. The steam supply passage 1042 according to the sixth embodiment has the spiral passage 1124 in contact with the inner surface of the reforming reaction tube 1018. Thus the reformed gas is evaporated more efficiently so as to generate the steam. The raw fuel gas containing the steam is gradually heated by the heat of the combustion exhaust gas when passing through inside the catalyst layer 1036 and is changed into a hydrogen-rich reformed gas through the reforming reaction.

The reformed gas produced by reforming the raw fuel gas rises up in the reforming reaction tube 1018 with the flow of the raw fuel gas supplied, and reaches the shift reactor 1014. Here, since the reforming reaction in the reformer 1012 is an endothermic reaction, the reformed gas whose temperature has dropped due to the heat recovery formed in the steam supply passage 1042 reaches the shift reactor 1014. The shift reaction in the shift reactor 1014 is carried out in the range of 200 to 300° C., for instance, and the heat balance is achieved by the heat recovery in the steam supply passage 1042. Thus, an appropriate temperature can be maintained without performing any particular temperature control. As a result, the carbon monoxide in the reformed gas can be reduced in the shift reactor 1014.

If the temperature in the shift reactor 1014 does not become the appropriate temperature, the temperature can be adjusted by adjusting the fuel quantity of the raw fuel in the burner 1020 or varying the number of turns of the spiral-shaped steam supply passage 1042 in the vicinity of the shift reactor 1014.

While the flow through the interior of the reforming reaction tube 1018 is being regulated by a current plate 1064, the reformed gas whose carbon monoxide has been reduced in the shift reactor 1014 rises up further with the flow of the raw fuel gas supplied and then reaches the selective oxidation unit 1016. At this time, the air supplied from the air supply passage 1054 also rises up in the reforming reaction tube 1018 and then reaches the selective oxidation unit 1016. The current plate 1064 is provided between a space between the shift reactor 1014 and the selective oxidation unit 1016. This current plate 1064 changes the flow direction of reformed gas toward the steam supply passage 1042. That is, the flow direction of reformed gas flowing through inside the reforming reaction tube 1018 is changed toward the steam supply passage 1042, so that the heat exchange between the reforming water or raw fuel gas flowing through the steam supply passage 1042 and the reformed gas can be carried out efficiently.

The selective oxidation unit 1016 is disposed near an inlet 1066 of the steam supply passage 1042, so that the temperature of the reformed gas is lower than that in the shift reactor 1014 because the reformed gas has been cooled by the reforming water. The selective oxidation reaction in the selective oxidation unit 1016 is carried out in the range of 70 to 200° C., for instance, which is lower than the temperature at which the shift reaction is carried out in the shift reactor 1014, and the heat balance is achieved by the heat recovery in the steam supply passage 1042. Thus, the reformed gas can be maintained at an appropriate temperature without performing any particular temperature control. As a result, the carbon monoxide in the reformed gas is further reduced in the selective oxidation unit 1016.

As described above, the fuel cell reforming apparatus 1010 is structured such that the reformer 1012, the shift reactor 1014 and the selective oxidation unit 1016 are housed in a single reforming reaction tube 1018 in this order. Hence, carbon monoxide contained in the reformed gas can be reduced without the formation of an intricately-shaped passage. Also, the combustion exhaust gas passes through the heated flow passage 1032 provided between the reforming reaction tube 1018 and the outer casing 1022. As a result, the heat required for the reforming reaction in the reformer 1012 within the reforming reaction tube 1018 can be supplied and therefore a heating means such as a heater is no longer necessary. Also, a space between the reforming reaction tube 1018 and the outer casing 1022 serves as the heated flow passage 1032. As a result, a passage requiring a many-folded structure with folded-back portions or many tubes is eliminated, so that the fuel cell reforming apparatus 1010 can be realized with a simple structure.

In other words, the passage requiring folded-back portions or many cylindrical structures is eliminated in the fuel cell reforming apparatus 1010 according to the sixth embodiment. As a result, the number of parts required is reduced and the manufacturing process is simplified, thus reducing the overcall cost. Also, the periphery of the outer casing 1022 is covered with the heat insulating material 1024, thus easily securing excellent heat insulating property. Hence, the process necessary for mounting the heat insulating material 1024 can be simplified.

Further, the heated flow passage 1032 is formed in a manner such that the combustion exhaust gas passes through from a reformer 1012 side toward a selective oxidation unit 1016 side. As a result, while heat-exchanging with the reforming reaction tube 1018 or the steam supply passage 1042, the combustion exhaust gas gradually drops its temperature. Thus, the combustion exhaust gas passes through inside the heated flow passage 1032 from the reformer 1012 with a high reaction temperature toward the selective oxidation unit 1016 with a low reaction temperature while the temperature thereof drops appropriately. This enables forming the heated flow passage 1032 in a linear manner.

In the above-described fuel cell reforming apparatus 1010, the raw fuel supply passage 1040 may be structured such that the raw fuel supply passage 1040 joins together with the steam supply passage 1042 at a merging part disposed downstream of a position where the water passing through the steam supply passage 1042 is evaporated. In this manner, the raw fuel and the steam join together after the temperature of the raw fuel has risen, due to the combustion exhaust gas heated, in the raw fuel supply passage 1040 and after the water has been evaporated in the steam supply passage 1042, separately. This makes it easy to control the supply of steam as a result of the temperature rise of the raw fuel or the evaporation of water in each supply passage.

The spiral passage 1124 formed in a coil-like shape may be provided over the entire area of the steam supply passage 1042 or provided partially or sparsely thereon. It may be designed in consideration of the thermal efficiency or heat balance of the apparatus as a whole.

Seventh Embodiment

Figure 7:
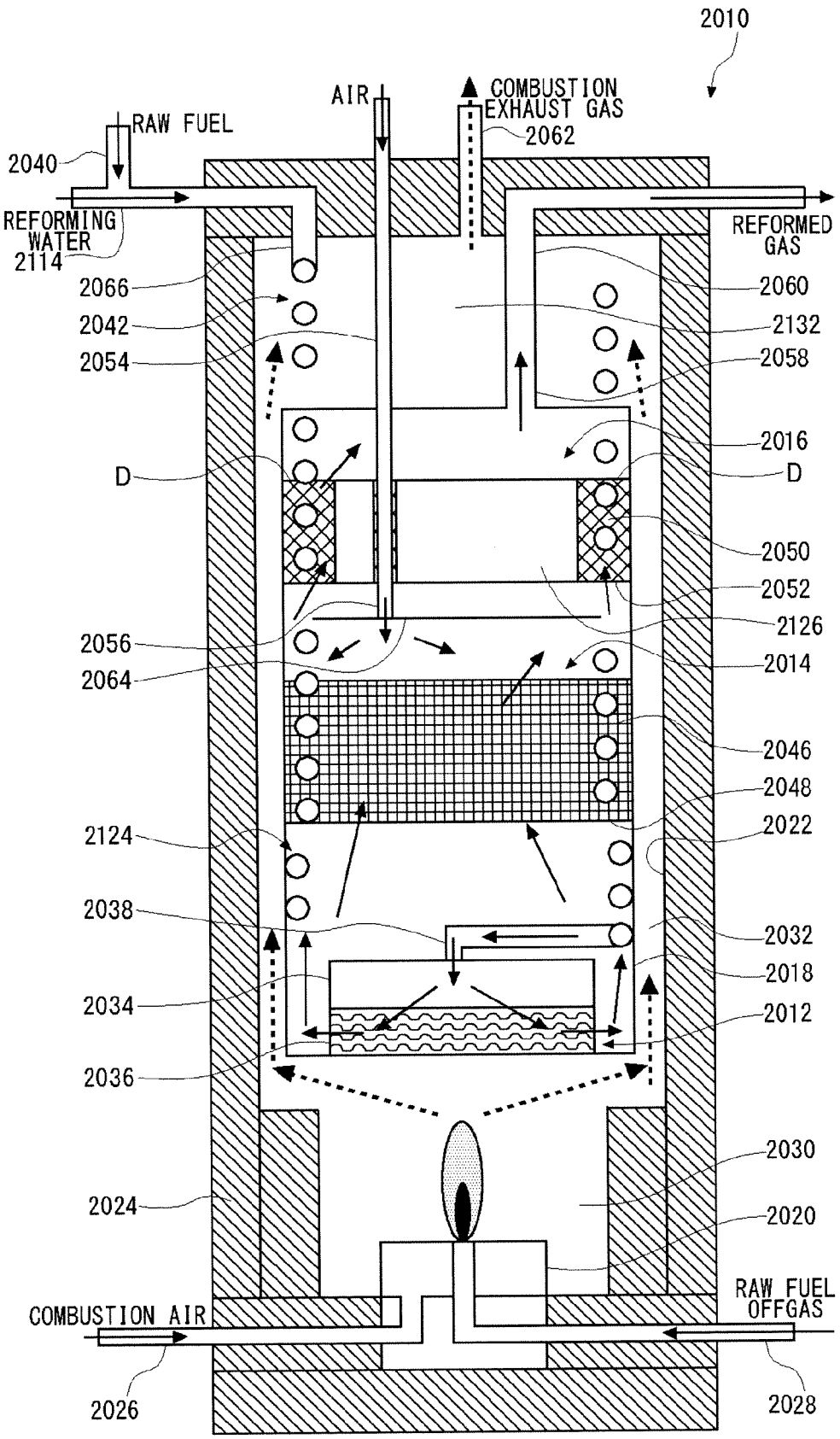
FIG. 7 is a cross-sectional view illustrating a structure of a reforming apparatus for use in a fuel cell according to a seventh embodiment of the present invention.

FIG. 7 is a cross-sectional view illustrating a structure of a reforming apparatus 2010 for use in a fuel cell according to a seventh embodiment of the present invention. The fuel cell reforming apparatus 2010 produces hydrogen-rich reformed gas by subjecting the raw fuel, such as methane, propane and butane, to steam reforming.

The fuel cell reforming apparatus 2010 includes a reformer 2012 for producing the reformed gas from the raw fuel, a shift reactor 2014 for reducing the carbon monoxide contained in the reformed gas through a shift reaction, a selective oxidation unit 2016 for reducing the carbon monoxide contained in the reformed gas which has passed through the shift reactor 2014 by performing selective oxidation on said carbon monoxide through a selective oxidation reaction, a reforming reaction tube 2018 which houses linearly the reformer 2012, the shift reactor 2014 and the selective oxidation unit 2016 in this order, a burner 2020, as a combustion means, for generating combustion exhaust gas by combusting the raw fuel, and an outer casing 2022, disposed coaxially around the reforming reaction tube 2018, having a larger diameter than that of the reforming reaction tube 2018. The periphery of the outer casing 2022 is covered with a heat insulating material 2024 except for portions where a plurality of pipings communicate with the exterior. Preferably, the reforming reaction tube 2018 is arranged vertically such that a reformer 2012 side thereof is arranged at a lower position thereof and a selective oxidation unit 2016 side thereof is arranged at an upper position thereof.

In the burner 2020, the air taken in from an air inlet 2026 and the raw fuel offgas taken in from a fuel inlet 2028 are mixed together so as to be combusted. The combustion of the raw fuel gas by the burner 2020 produces the high-temperature combustion exhaust gas of 1200 to 1300° C. The burner 2020 is placed in a combustion chamber 2030 formed at one end of a reformer 2012 side of the reforming reaction tube 2018, and is fixed to a lower part of the outer casing 2022. As a result, the combustion exhaust gas produced in the burner 2020 can be immediately used for the reforming reaction in the reformer 2012. Thus the thermal efficiency can be enhanced.

A heated flow passage 2032, through which the aforementioned combustion exhaust gas passes to heat the reforming reaction tube 2018, is formed between the reforming reaction tube 2018 and the outer casing 2022.

The reformer 2012 includes a casing 2034, provided on the bottom of the reforming reaction tube 2018, whose outside diameter is smaller than that of the reforming reaction tube 2018, and a catalyst layer 2036 containing a reforming catalyst where metal particles such as nickel or ruthenium are supported on alumina, the catalyst layer 2036 also being housed on a lower side of the casing 2034. An opening 2038 is formed on the top surface of the casing 2034; and the raw fuel and the steam flow into the opening 2038 with the raw fuel and the steam being mixed together. The casing 2034 has ventilation holes provided on the side surfaces so that the reformed gas can pass through the side surfaces of the catalyst layer 2036.

The raw fuel is supplied from the exterior of the fuel cell reforming apparatus 2010 to the catalyst layer 2036 in the reformer 2012 via a raw fuel supply passage 2040. While the raw fuel is being supplied to the catalyst layer 2036, the temperature of the raw fuel is raised by the combustion exhaust gas flowing through the heated flow passage 2032 or reformed gas inside the reforming reaction tube 2018 and, at the same time, the temperature of the reformed gas is lowered thereby.

The steam required for the reforming reaction in the reformer 2012 is generated from the reforming water supplied from the exterior of the fuel cell reforming apparatus 2010 via a steam supply passage 2042. The steam supply passage 2042 is so provided that the reforming water flows through the reforming reaction tube 2018 from the selective oxidation unit 2016 side toward the reformer 2012 side. The steam supply passage 2042 recovers the heat from the combustion exhaust gas or the reformed gas heated inside the reforming reaction tube 2018, and the reforming water, which is a liquid supplied externally, is evaporated into steam by this heat. As a result, the reforming water is supplied to the catalyst layer 2036 as steam. At the same time, this reforming water lowers the temperatures of the shift reactor 2014 or the selective oxidation unit 2016.

In the fuel cell reforming apparatus 2010 according to the seventh embodiment, the raw fuel supply passage 2040 joins together with the steam supply passage 2042 at a merging part 2114 disposed upstream of a position where the water passing through the steam supply passage 2042 is evaporated. Inside the outer casing 2022 and the reforming reaction tube 2018, part of the steam supply passage 2042 is of a spirally-wound coil shape. Also, as the surface area of the steam supply passage 2042 becomes larger, the water is more likely to be evaporated. Hence, the steam is produced at least at a lower end of a coil. Also, the steam supply passage 2042 is so provided within the reforming reaction tube 2018 that the water flows from the selective oxidation unit 2016 side toward the reformer 2012 side. Hence, the pressure variation due to the water obstruction at the vaporization of water can be suppressed.

The shift reactor 2014 includes a catalyst layer 2046 comprised of pellets made of copper oxide or zinc oxide, for instance, and a divider plate 2048 where holes are so formed as to support the catalyst layer 2046 and transmit the reformed gas from below to above. The shift reactor 2014 can reduce the carbon monoxide by a shift reaction, using the steam contained in the reformed gas, due to the activity of the catalyst layer 2046.

The selective oxidation unit 2016 includes a catalyst layer 2050, comprised of carbon monoxide selective oxidation catalyst, supported on alumina, for instance, and a divider plate 2052 where holes are so formed as to support the catalyst layer 50 and transmit the reformed gas from below to above. In the selective oxidation unit 2016, the carbon monoxide is combined with oxygen and converted into carbon dioxide through the activity of the catalyst layer 2050 and therefore the concentration of carbon monoxide is further reduced.

The selective oxidation unit 2016 according to the seventh embodiment, a resistance member 2126 that gives resistance to the flow of reformed gas is provided in an area excluding an area D where the steam supply passage 2042 passes through. This makes it easy for the reformed gas heated by the combustion exhaust to flow toward the coil of the steam supply passage 2042 passing through the selective oxidation unit 2016, thus making it easy to supply the heat to the water or steam in the steam supply passage 2042. A material or member that shuts off completely the flow of reformed gas may be suitable as the resistance member 2126. With the provision of the resistance member 2126, the reformed gas is introduced into the catalyst layer 2050 of the selective oxidation unit 2016. Even though such a resistance member as described above is provided in the shift reactor 2014, the similar advantageous effects can be achieved.

In an area between the shift reactor 2014 and the selective oxidation unit 2016 there is disposed a tip part 2056 of an air supply passage 2054 that communicates with the exterior of the fuel cell reforming apparatus 2010 to supply the oxygen to be consumed in the selective oxidation unit 2016. As a result, the air flowing through the tip part 2056 rises together with the reformed gas whose carbon monoxide has been reduced in the shift reactor 2014, thus contributing to the reaction in the selective oxidation unit 2016.

An opening 2058 is formed on the top surface of the reforming reaction tube 2018 above the selective oxidation unit 2016. A reformed gas supply pipe 2060 is connected to the opening 2058. The reformed gas supply pipe 2060 delivers the reformed gas whose carbon monoxide concentration has been sufficiently reduced, to a fuel electrode of a fuel cell (not shown).

An operation of the fuel cell reforming apparatus 2010 according to the seventh embodiment is now described. The combustion exhaust gas produced in the burner 2020 heats up the underside of the reforming reaction tube 2018 and then heats up the side surface thereof as the combustion exhaust gas rises up the heated flow passage 2032. At this time, the catalyst layer 2036 is heated to a temperature range of 600 to 700° C., for instance, required for the reforming reaction, via the reforming reaction tube 2018. Also, the steam supply passage 2042 is directly heated or indirectly heated by the combustion exhaust gas via the reformed reaction tube 2018, so that the reforming water passing through inside thereof is evaporated. At the same time, as the combustion exhaust gas rises up the heated flow passage 2032, the combustion exhaust gas is cooled by the steam supply passage 2042 and the temperature thereof drops gradually.

The raw fuel supply passage 2040 joins together with the steam supply passage 2042 at a merging part 2114. The reforming water and the raw fuel are mixed at the merging part 2114 and are sent into the casing 2034 on a lower side thereof while the mixture of the reforming water and the raw fuel is being evaporated and the temperature thereof is being raised. The steam supply passage 2042 according to the seventh embodiment has a spiral passage 2124 in contact with the inner surface of the reforming reaction tube 2018. Thus, the heat from not only the reformed gas but also the combustion exhaust gas can be recovered easily. As a result, the reformed water can be evaporated more efficiently so as to generate the steam. The raw fuel gas containing the steam is gradually heated by the heat of the combustion exhaust gas when passing through inside the catalyst layer 2036 and is changed into a hydrogen-rich reformed gas through the reforming reaction.

The reformed gas produced by reforming the raw fuel gas rises up in the reforming reaction tube 2018 with the flow of the raw fuel gas supplied, and reaches the shift reactor 2014. Here, since the reforming reaction in the reformer 2012 is an endothermic reaction, the reformed gas whose temperature has dropped due to the heat recovery formed in the steam supply passage 2042 reaches the shift reactor 2014. The shift reaction in the shift reactor 2014 is carried out in the range of 200 to 300° C., for instance, and the heat balance is achieved by the heat recovery in the steam supply passage 2042. Thus, an appropriate temperature can be maintained without performing any particular temperature control. As a result, the carbon monoxide in the reformed gas can be reduced in the shift reactor 2014.

If the temperature in the shift reactor 2014 does not become the appropriate temperature, the temperature can be adjusted by adjusting the fuel quantity of the raw fuel in the burner 2020 or varying the number of turns of the spiral-shaped steam supply passage 2042 in the vicinity of the shift reactor 2014.

While the flow through the interior of the reforming reaction tube 2018 is being regulated by a current plate 2064, the reformed gas whose carbon monoxide has been reduced in the shift reactor 2014 rises up further with the flow of the raw fuel gas supplied and then reaches the selective oxidation unit 2016. At this time, the air supplied from the air supply passage 2054 also rises up in the reforming reaction tube 2018 and then reaches the selective oxidation unit 2016. The current plate 2064 changes the flow of reformed gas to a flow toward the steam supply passage 2042, in a space between the shift reactor 2014 and the selective oxidation unit 2016. That is, the flow of reformed gas flowing through inside the reforming reaction tube 2018 is changed toward the steam supply passage 2042, so that the heat exchange between the reforming water or raw fuel gas flowing through the steam supply passage 2042 and the reformed gas can be carried out efficiently.

The selective oxidation unit 2016 is disposed near an inlet 2066 of the steam supply passage 2042, so that the temperature of the reformed gas is lower than that in the shift reactor 2014 because the reformed gas has been cooled by the reforming water. The selective oxidation reaction in the selective oxidation unit 2016 is carried out in the range of 70 to 200° C., for instance, which is lower than the temperature at which the shift reaction is carried out in the shift reactor 2014, and the heat balance is achieved by the heat recovery in the steam supply passage 2042. Thus, the reformed gas can be maintained at an appropriate temperature without performing any particular temperature control. As a result, the carbon monoxide in the reformed gas is further reduced in the selective oxidation unit 2016.

Though the reformed gas is delivered toward the fuel electrode of a fuel cell from the reformed gas supply pipe 2060, the temperature of the reformed gas discharged from the reformed gas supply pipe 2060 drops due to the heat recovery through the steam supply passage 2042. Thus, the reforming efficiency in the fuel cell reforming apparatus 2010 can be enhanced.

The combustion exhaust gas having passed through the heated flow passage 2032 is discharged to the exterior from an exhaust outlet 2062 provided on top of the outer casing 2022 via a combustion exhaust gas storage chamber 2132. Here, the combustion exhaust gas storage chamber 2132 occupies a space above the reforming reaction tube 2018 and is formed between the reforming reaction tube 2018 and the outer casing 2022. The steam supply passage 2042 according to the seventh embodiment is so provided that a part of the steam supply passage 2042 passes through the combustion exhaust gas storage chamber 2132, and therefore the heat can be recovered from the combustion exhaust gas that passes through the heated flow passage 2032 and is finally discharged from the exhaust outlet 2062. Accordingly, the temperature of the combustion exhaust gas discharged from the exhaust outlet 2062 drops due to the heat exchange through the steam supply passage 2042, so that the reforming efficiency in the fuel cell reforming apparatus 2010 can be enhanced.

As described above, the fuel cell reforming apparatus 2010 is structured such that the reformer 1012, the shift reactor 2014 and the selective oxidation unit 2016 are housed in a single reforming reaction tube 2018 in this order. Hence, carbon monoxide contained in the reformed gas can be reduced without the formation of an intricately-shaped passage. Also, the combustion exhaust gas passes through the heated flow passage 2032 provided between the reforming reaction tube 2018 and the outer casing 2022. As a result, the heat required for the reforming reaction in the reformer 2012 within the reforming reaction tube 2018 can be supplied and therefore a heating means such as a heater is no longer necessary. Also, a space between the reforming reaction tube 2018 and the outer casing 2022 serves as the heated flow passage 2032. As a result, a passage requiring a many-folded structure with folded-back portions or many tubes is eliminated, so that the fuel cell reforming apparatus 2010 can be realized with a simple structure.

In other words, the passage requiring folded-back portions or many cylindrical structures is eliminated in the fuel cell reforming apparatus 2010 according to the seventh embodiment. As a result, the number of parts required is reduced and the manufacturing process is simplified, thus reducing the overall cost. Also, the periphery of the outer casing 2022 is covered with the heat insulating material 2024, thus easily securing excellent heat insulating property. Hence, the process necessary for mounting the heat insulating material 2024 can be simplified.

Further, the heated flow passage 2032 is formed in a manner such that the combustion exhaust gas passes through from a reformer 2012 side toward a selective oxidation unit 2016 side. As a result, while heat-exchanging with the reforming reaction tube 2018 or the steam supply passage 2042, the combustion exhaust gas gradually drops its temperature. Thus, the combustion exhaust gas passes through inside the heated flow passage 2032 from the reformer 2012 with a high reaction temperature toward the selective oxidation unit 2016 with a low reaction temperature while the temperature thereof drops appropriately. This enables the heated flow passage 2032 to be formed linearly. Also, the reforming reaction tube 2018 houses vertically (upwardly) the reformer 2012, the shift reactor 2014 and the selective oxidation unit 2016 in descending order of reaction temperature. Accordingly, while the temperature drops appropriately due to the heat exchange with the steam supply passage 2042, the reformed gas rises up in the reforming reaction tube 2018 from the reformer 2012 with a high reaction temperature toward the selective oxidation unit 2016 with a low reaction temperature, without passing through a complicated passage.

In the above-described fuel cell reforming apparatus 2010, the raw fuel supply passage 2040 may be structured such that the raw fuel supply passage 2040 joins together with the steam supply passage 2042 at a merging part disposed downstream of a position where the water passing through the steam supply passage 2042 is evaporated. In this manner, the raw fuel and the steam join together after the temperature of the raw fuel has risen, due to the combustion exhaust gas heated, in the raw fuel supply passage 2040 and after the water has been evaporated in the steam supply passage 2042, separately. This makes it easy to control the supply of steam as a result of the temperature rise of the raw fuel or the evaporation of water in each supply passage.

The spiral passage 2124 formed in a coil-like shape may be provided over the entire area of the steam supply passage 2042 or provided partially or sparsely thereon. It may be designed in consideration of the thermal efficiency or heat balance of the apparatus as a whole.

Eighth Embodiment

Figure 8:
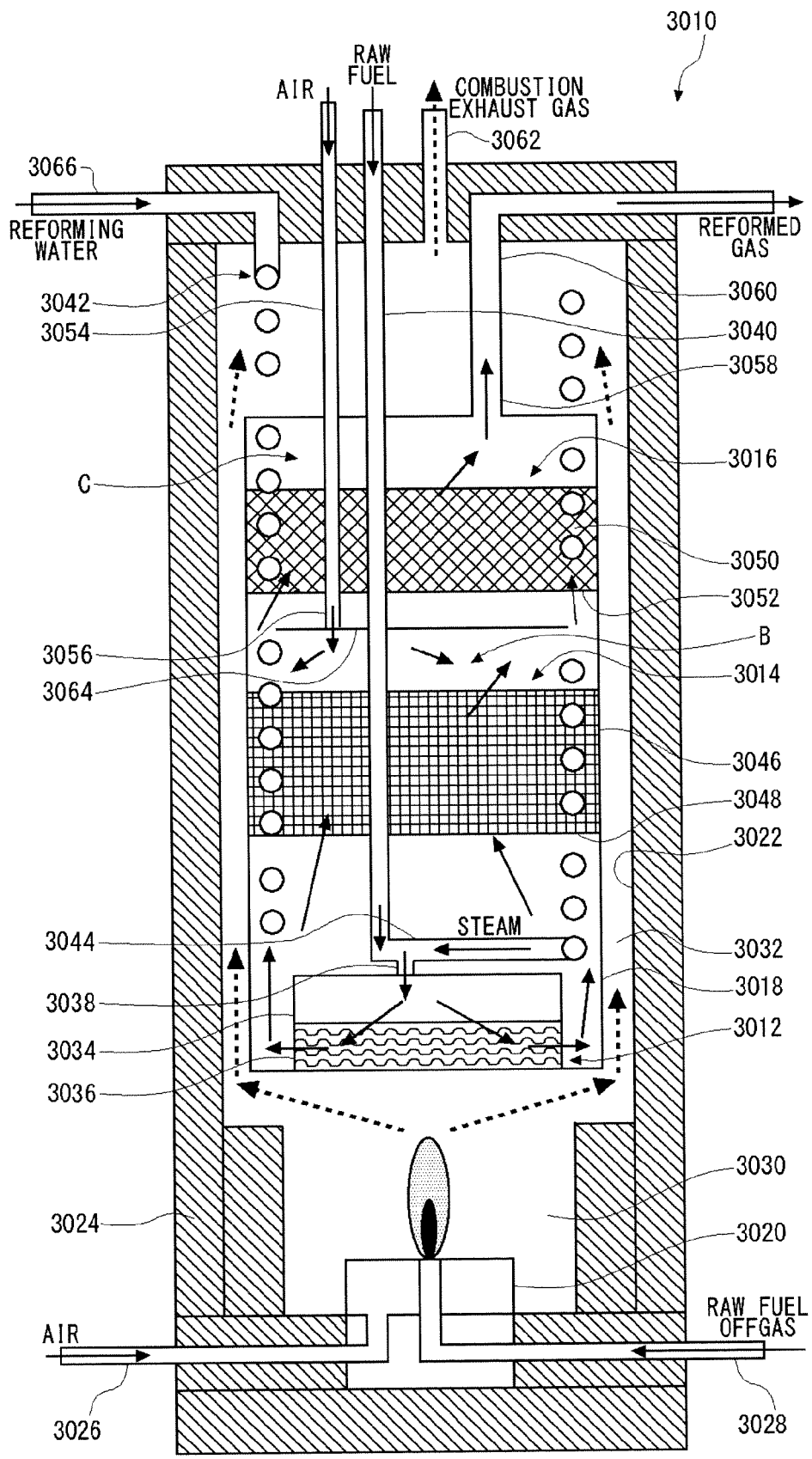
FIG. 8 is a cross-sectional view illustrating a structure of a reforming apparatus for use in a fuel cell according to an eighth embodiment of the present invention.

FIG. 8 is a cross-sectional view illustrating a structure of a reforming apparatus 3010 for use in a fuel cell according to an eighth embodiment of the present invention. The fuel cell reforming apparatus 3010 produces hydrogen-rich reformed gas by subjecting the raw fuel, such as methane, propane and butane, to steam reforming.

The fuel cell reforming apparatus 3010 includes a reformer 3012 for producing the reformed gas from the raw fuel, a shift reactor 3014 for reducing the carbon monoxide contained in the reformed gas through a shift reaction, a selective oxidation unit 3016 for reducing the carbon monoxide contained in the reformed gas which has passed through the shift reactor 3014 by performing selective oxidation on said carbon monoxide through a selective oxidation reaction, a reforming reaction tube 3018 which houses linearly the reformer 3012, the shift reactor 3014 and the selective oxidation unit 3016 in this order, a burner 3020, as a combustion means for generating combustion exhaust gas by combusting the raw fuel, and an outer casing 3022, disposed coaxially around the reforming reaction tube 3018, having a larger diameter than that of the reforming reaction tube 3018. The periphery of the outer casing 3022 is covered with a heat insulating material 3024 except for portions where a plurality of pipings communicate with the exterior. The reforming reaction tube 3018 is arranged vertically such that the reforming unit 3012 side thereof is arranged at a lower position thereof and the selective oxidation unit 3016 side thereof is arranged at an upper position thereof.

In the burner 3020, the air taken in from an air inlet 3026 and the raw fuel offgas taken in from a fuel inlet 3028 are mixed together so as to be combusted. The combustion of the raw fuel gas by the burner 3020 produces the high-temperature combustion exhaust gas of 1200 to 1300° C. The burner 3020 is placed in a combustion chamber 3030 formed at one end of a reformer 3012 side of the reforming reaction tube 3018, and is fixed to a lower part of the outer casing 3022. As a result, the combustion exhaust gas produced in the burner 3020 can be immediately used for the reforming reaction in the reformer 3012. Thus the thermal efficiency can be enhanced.

A heated flow passage 3032, through which the aforementioned combustion exhaust gas passes to heat the reforming reaction tube 3018, is formed between the reforming reaction tube 3018 and the outer casing 3022.

The reformer 3012 includes a casing 3034, provided on the bottom of the reforming reaction tube 3018, whose outside diameter is smaller than that of the reforming reaction tube 3018, and a catalyst layer 3036 containing a reforming catalyst where metal particles such as nickel or ruthenium are supported on alumina, the catalyst layer 3036 also being housed on a lower side of the casing 3034. An opening 3038 is formed on the top surface of the casing 3034; and the raw fuel and the steam flow into the opening 3038 with the raw fuel and the steam being mixed together. The casing 3034 has ventilation holes provided on the side surfaces so that the reformed gas can pass through the side surfaces of the catalyst layer 3036.

The raw fuel is supplied from the exterior of the fuel cell reforming apparatus 3010 to the catalyst layer 3036 in the reformer 3012 via a raw fuel supply passage 3040 that penetrates the reforming reaction tube 3018, the outer casing 3022 and the heat insulating material 3024. While the raw fuel is being supplied to the catalyst layer 3036, the temperature of the raw fuel is raised by the combustion exhaust gas flowing through the heated flow passage 3032 or reformed gas inside the reforming reaction tube 3018 and, at the same time, the temperature of the reformed gas is lowered thereby.

The steam required for the reforming reaction in the reformer 3012 is generated from the reforming water supplied from the exterior of the fuel cell reforming apparatus 3010 via a steam supply passage 3042. The reforming water, which is a liquid supplied externally, is evaporated by the heat recovery between the combustion exhaust gas and the reformed gas heated inside the reforming reaction tube 3018 and is then supplied to the catalyst layer 3036 as steam. The reforming water lowers the temperature of the shift reactor 3014 or the selective oxidation unit 3016.

In the fuel cell reforming apparatus 3010 according to the eighth embodiment, the raw fuel supply passage 3040 joins together with the steam supply passage 3042 at a merging part 3044 disposed downstream of a position where the water passing through the steam supply passage 3042 is evaporated. Inside the outer casing 3022 and the reforming reaction tube 3018, part of the steam supply passage 3042 is of a spirally-wound coil shape. Also, as the surface area of the steam supply passage 3042 becomes larger, the water is more likely to be evaporated. Hence, the steam is produced at least at a lower end of a coil upstream of the merging part 3044.

As with the fuel cell reforming apparatus 3010 according to the eighth embodiment, the raw fuel and the steam join together after the temperature of the raw fuel has risen, due to the combustion exhaust gas heated, in the raw fuel supply passage 3040 and after the water has been evaporated in the steam supply passage 3042, separately. This makes it easy to control the supply of steam as a result of the temperature rise of the raw fuel or the evaporation of water in each supply passage.

The shift reactor 3014 includes a catalyst layer 3046 comprised of pellets made of copper oxide or zinc oxide, for instance, and a divider plate 3048 where holes are so formed as to support the catalyst layer 3046 and transmit the reformed gas from below to above. The shift reactor 3014 can reduce the carbon monoxide by a shift reaction, using the steam contained in the reformed gas, due to the activity of the catalyst layer 3046. The divider plate 3048 divides the interior of the reforming reaction tube 3018 into a reformer side where the reforming reaction takes place and a shift reactor side where the shift reaction takes place. The divider plate 3048 also supports the filled catalyst layer 3046 from below.

The selective oxidation unit 3016 includes a catalyst layer 3050, comprised of carbon monoxide selective oxidation catalyst, supported on alumina, for instance, and a divider plate 3052 where holes are so formed as to support the catalyst layer 3050 and transmit the reformed gas from below to above. In the selective oxidation unit 3016, the carbon monoxide is combined with oxygen and converted into carbon dioxide through the activity of the catalyst layer 3050 and therefore the concentration of carbon monoxide is further reduced. The divider plate 3052 divides the interior of the reforming reaction tube 3018 into a shift reactor side where the shift reaction takes place and a selective oxidation unit side where the selective oxidation takes place. The divider plate 3052 also supports the filled catalyst layer 3050 from below.

In the fuel cell reforming apparatus 3010 according to the eighth embodiment, the catalysts can be supported by the divider plate 3048 and the divider plate 3052 provided inside the reforming reaction tube 3018, respectively. Thus the catalyst may be filled in an area B, surrounded by the divider plate 3048 and the reforming reaction tube 3018, and an area C, surrounded by the divider plate 3052 and the reforming reaction tube 3018. As a result, the catalyst can be easily filled. Also, the reforming reaction tube 3018 houses linearly the reformer 3012, the shift reactor 3014 and the selective oxidation unit 3016, so that each reaction part can be easily separated. Also, the catalysts are supported by the divider plates 3048 and 3052, so that the catalysts within the reforming reaction tube 3018 can be arranged at appropriate positions using a simple structure, without taking the shape of being narrowed down along the reforming reaction tube 3018 to separate each reaction part or adding other parts or pipings.

In an area between the shift reactor 3014 and the selective oxidation unit 3016 there is disposed a tip part 3056 of an air supply passage 3054 that communicates with the exterior of the fuel cell reforming apparatus 3010 to supply the oxygen to be consumed in the selective oxidation unit 3016. As a result, the air flowing through the tip part 3056 rises together with the reformed gas whose carbon monoxide has been reduced in the shift reactor 3014, thus contributing to the reaction in the selective oxidation unit 4016.

An opening 3058 is formed on the top surface of the reforming reaction tube 3018 above the selective oxidation unit 3016. A reformed gas supply pipe 3060 is connected to the opening 3058. The reformed gas supply pipe 3060 delivers the reformed gas whose carbon monoxide concentration has been sufficiently reduced, to a fuel electrode of a fuel cell (not shown).

Figure 9:
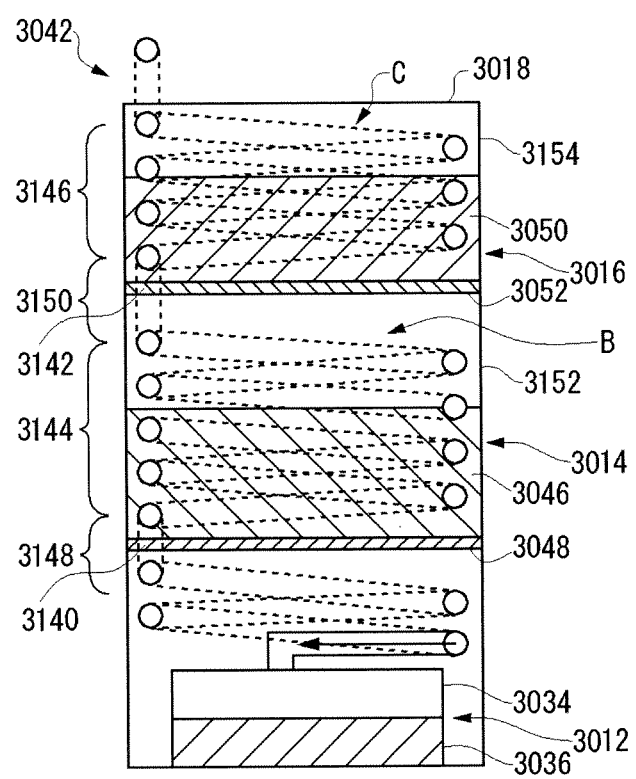
FIG. 9 is a cross-sectional view of major portions illustrating part of components or members in the vicinity of a steam supply passage in a reforming reaction tube of a fuel cell reforming apparatus shown in FIG. 8.

A detailed description is now given of a positional relation between the steam supply passage 3042 and the divider plates 3048 and 3052 according to the eighth embodiment. FIG. 9 is a cross-sectional view of major portions illustrating part of components or members in the vicinity of the steam supply passage 3042 in the reforming reaction tube 3018 of the fuel cell reforming apparatus 3010 shown in FIG. 8.

As shown in FIG. 9, a through-hole 3140 is formed in the divider plate 3048 so that the steam supply passage 3042 can penetrate the divider plate 3048 in the vertical direction. Similarly, a through-hole 3142 is formed in the divider plate 3052 so that the steam supply passage 3042 can penetrate the divider plate 3052 in the vertical direction. With this structure as described above, the steam supply passage 3042 is provided within the reforming reaction tube 3018. At the same time, filling the catalyst around the steam supply passage 3042 enables the catalyst layer 3046 and the catalyst layer 3050 to be easily arranged in the area surrounded by the divider plate 3048 and the reforming reaction tube 3018 and the area surround by the divider plate 3052 and the reforming reaction tube 3018, respectively.

Also, the steam supply passage 3042 according to the eighth embodiment has spiral portions 3144 and 3146 formed in a coil-like shape, and linear portions 3148 and 3150 extending in the vertical direction of the reforming reaction tube 3018. The through-hole 3140 is formed in the divider plate 3048, and the steam supply passage 3042 penetrates the divider plate 3048 at the linear portion 3148. Also, the through-hole 3142 is formed in the divider plate 3052, and the steam supply passage 3042 penetrates the divider plate 3052 at the linear portion 3150. With this structure employed in the present embodiment, the steam supply passage 3042 is easily penetrated through the divider plate 3048 and the divider plate 3052 when manufacturing the apparatus.

The divider plates 3048 and 3052 each has a plurality of microscopic ventilation holes (not shown) such that the catalysts of the catalyst layer 3046 and the catalyst layer 3050 do not fall down and to the degree such that the reformed gas can pass through them. The size of a through hole may be selected appropriately according to the mode and/or size of a catalyst used. For instance, the size of the ventilation hole in the divider plate 3048 is preferably smaller than that of a pellet, made of copper oxide or zinc oxide, in the catalyst layer 3046. The provision of such ventilation holes as described above enables the reformed gas to be delivered to the shift reactor 3014 or the selective oxidation unit 3016 from the reformer 3012, without separately providing a passage, which communicates with the areas above and below the divider plate 3048 or the divider plate 3052, inside or outside the reforming reaction tube 3018.

In the reforming reaction tube 3018 according to the eighth embodiment, filler inlets 3152 and 3154 through which the catalysts are to be filled therein are formed on the side surfaces above the divider plates 3048 and 3052, respectively. As a result, the catalysts can be inputted to the interior of the reforming reaction tube 3018 from the filler inlets 3152 and 3154, respectively even though, for instance, the divider plate 3048 and the divider plate 3052 are fixed inside the reforming reaction tube 3018. Hence, the degree of freedom with respect to the order in which a catalyst filling process proceeds in a manufacturing process and the degree of freedom of the posture of the reforming reaction tube at the time of filling the catalyst is raised.

Also, in the fuel cell reforming apparatus 3010 according to the eighth embodiment, the heated flow passage 3032 is disposed exterior to the reforming reaction tube 3018 and therefore the heated flow passage 3032 does not cross the reforming reaction tube 3018. Thus structure of the interior of the reforming reaction tube 3018 is such that the catalyst is easily movable. Accordingly, even if, for instance, the posture of the reforming reaction tube 3018 is sideways or tilted when the catalyst is to be inputted in the areas B and C separated by the divider plate 3048 and 3052, the unevenly distributed catalyst can be easily turned into the catalyst layers 3046 and 3050 having uniform thickness by thereafter bringing back the posture of the reforming reaction tube 3018 to the normal straight position. As a result, the workability of the catalyst filling process improves.

An operation of the fuel cell reforming apparatus 3010 according to the eighth embodiment is now described. The combustion exhaust gas produced in the burner 3020 heats up the underside of the reforming reaction tube 3018 and then heats up the side surface thereof as the combustion exhaust gas rises up the heated flow passage 3032. At this time, the catalyst layer 3036 is heated to a temperature range of 600 to 700° C., for instance, required for the reforming reaction, via the reforming reaction tube 3018. Also, the steam supply passage 3042 is directly heated or indirectly heated by the combustion exhaust gas via the reformed reaction tube 3018, so that the reforming water passing through inside thereof is evaporated. At the same time, as the combustion exhaust gas rises up the heated flow passage 3032, the combustion exhaust gas is cooled by the steam supply passage 3042 and the temperature thereof drops gradually. It is to be noted here that the combustion exhaust gas having passed through the heated flow passage 3032 is discharged to the exterior through an exhaust outlet 3062 provided on top of the outer casing 3022.

The steam evaporated in the steam supply passage 3042 and the raw fuel heated in the raw fuel supply passage 3040 are mixed at the merging part 3044 and then sent into the casing 3034 on a lower side thereof. The raw fuel gas containing the steam is gradually heated by the heat of the combustion exhaust gas when passing through inside the catalyst layer 3036 and is changed into a hydrogen-rich reformed gas through a reforming reaction.

The reformed gas produced by reforming the raw fuel gas rises up in the reforming reaction tube 3018 with the flow of the raw fuel gas supplied, and reaches the shift reactor 3014. Here, since the reforming reaction in the reformer 3012 is an endothermic reaction, the reformed gas whose temperature has dropped due to the heat recovery formed in the steam supply passage 3042 reaches the shift reactor 3014. The shift reaction in the shift reactor 3014 is carried out in the range of 200 to 300° C., for instance, and the heat balance is achieved by the heat recovery in the steam supply passage 3042. Thus, an appropriate temperature can be maintained without performing any particular temperature control. As a result, the carbon monoxide in the reformed gas can be reduced in the shift reactor 3014.

If the temperature in the shift reactor 3014 does not become the appropriate temperature, the temperature can be adjusted by adjusting the fuel quantity of the raw fuel in the burner 3020 or varying the number of turns of the spiral-shaped steam supply passage 3042 in the vicinity of the shift reactor 3014.

While the flow through the interior of the reforming reaction tube 3018 is being regulated by a current plate 3064, the reformed gas whose carbon monoxide has been reduced in the shift reactor 3014 rises up further with the flow of the raw fuel gas supplied and then reaches the selective oxidation unit 3016. At this time, the air supplied from the air supply passage 3054 also rises up in the reforming reaction tube 3018 and then reaches the selective oxidation unit 3016.

The selective oxidation unit 3016 is disposed near an inlet 3066 of the steam supply passage 3042, so that the temperature of the reformed gas is lower than that in the shift reactor 3014 because the reformed gas has been cooled by the reforming water. The selective oxidation reaction in the selective oxidation unit 3016 is carried out in the range of 70 to 200° C., for instance, which is lower than the temperature at which the shift reaction is carried out in the shift reactor 3014, and the heat balance is achieved by the heat recovery in the steam supply passage 3042. Thus, the reformed gas can be maintained at an appropriate temperature without performing any particular temperature control. As a result, the carbon monoxide in the reformed gas is further reduced in the selective oxidation unit 3016.

As described above, the fuel cell reforming apparatus 3010 is structured such that the reformer 3012, the shift reactor 3014 and the selective oxidation unit 3016 are housed in a single reforming reaction tube 3018 in this order. Hence, carbon monoxide contained in the reformed gas can be reduced without the formation of an intricately-shaped passage. Also, the combustion exhaust gas passes through the heated flow passage 3032 provided between the reforming reaction tube 3018 and the outer casing 3022. As a result, the heat required for the reforming reaction in the reformer 3012 within the reforming reaction tube 3018 can be supplied and therefore a heating means such as a heater is no longer required. Also, a space between the reforming reaction tube 3018 and the outer casing 3022 serves as the heated flow passage 3032. As a result, a passage requiring a many-folded structure with folded-back portions or many tubes is eliminated, so that the fuel cell reforming apparatus 3010 can be realized with a simple structure.

In other words, the passage requiring folded-back portions or many cylindrical structures is eliminated in the fuel cell reforming apparatus 3010 according to the eighth embodiment. As a result, the number of parts required is reduced and the manufacturing process is simplified, thus reducing the overcall cost. Also, the periphery of the outer casing 3022 is covered with the heat insulating material 3024, thus easily securing excellent heat insulating property. Hence, the process necessary for mounting the heat insulating material 3024 can be simplified.

Further, the heated flow passage 3032 is formed in a manner such that the combustion exhaust gas passes through from a reformer 3012 side toward a selective oxidation unit 3016 side. As a result, while heat-exchanging with the reforming reaction tube 3018 or the steam supply passage 3042, the combustion exhaust gas gradually drops its temperature. Thus, the combustion exhaust gas passes through inside the heated flow passage 3032 from the reformer 3012 with a high reaction temperature toward the selective oxidation unit 3016 with a low reaction temperature while the temperature thereof drops appropriately. This enables forming the heated flow passage 3032 in a linear manner.

Ninth Embodiment

Figure 10:
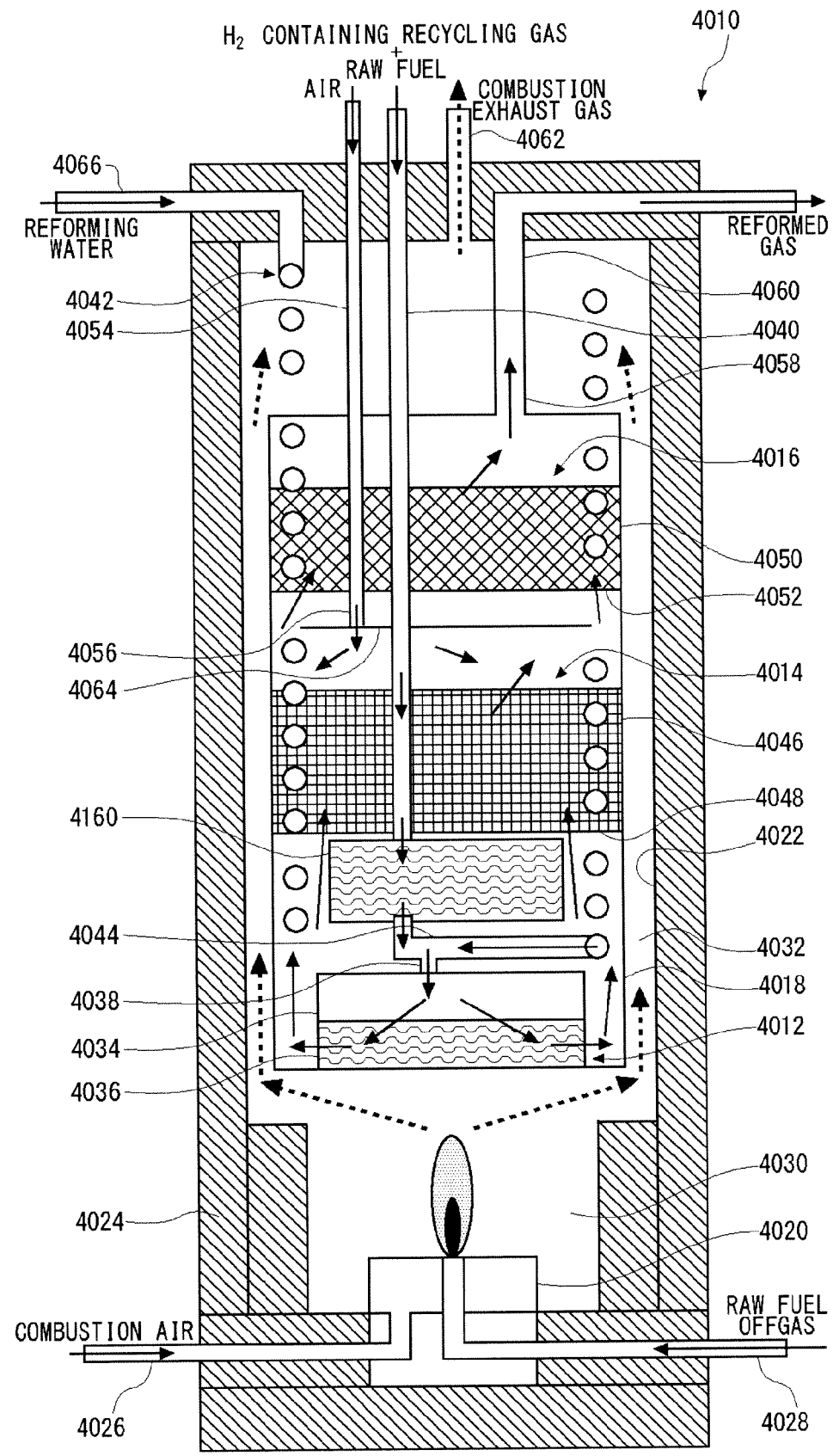
FIG. 10 is a cross-sectional view illustrating a structure of a reforming apparatus for use in a fuel cell according to a ninth embodiment of the present invention.

FIG. 10 is a cross-sectional view illustrating a structure of a reforming apparatus 4010 for use in a fuel cell according to a ninth embodiment of the present invention. The fuel cell reforming apparatus 4010 produces hydrogen-rich reformed gas by subjecting the raw fuel, such as methane, propane and butane, to steam reforming.

The fuel cell reforming apparatus 4010 includes a reformer 4012 for producing the reformed gas from the raw fuel, a shift reactor 4014 for reducing the carbon monoxide contained in the reformed gas through a shift reaction, a selective oxidation unit 4016 for reducing the carbon monoxide contained in the reformed gas which has passed through the shift reactor 4014 by performing selective oxidation on said carbon monoxide through a selective oxidation reaction, a reforming reaction tube 4018 which houses linearly the reformer 4012, the shift reactor 4014 and the selective oxidation unit 4016 in this order and which further houses a desulfurizer 4160, a burner 4020, as a combustion means, for generating combustion exhaust gas by combusting the raw fuel, and an outer casing 4022, disposed coaxially around the reforming reaction tube 4018, having a larger diameter than that of the reforming reaction tube 4018. The periphery of the outer casing 4022 is covered with a heat insulating material 4024 except for portions where a plurality of pipings communicate with the exterior.

In the burner 4020, the air taken in from an air inlet 4026 and the raw fuel offgas taken in from a fuel inlet 4028 are mixed together so as to be combusted. The combustion of the raw fuel gas by the burner 4020 produces the high-temperature combustion exhaust gas of 1200 to 1300° C. The burner 4020 is placed in a combustion chamber 4030 formed at one end of a reformer 4012 side of the reforming reaction tube 4018, and is fixed to a lower part of the outer casing 4022. As a result, the combustion exhaust gas produced in the burner 4020 can be immediately used for the reforming reaction in the reformer 3412. Thus the thermal efficiency can be enhanced.

A heated flow passage 4032, through which the aforementioned combustion exhaust gas passes to heat the reforming reaction tube 4018, is formed between the reforming reaction tube 4018 and the outer casing 4022.

The reformer 4012 includes a casing 4034, provided on the bottom of the reforming reaction tube 4018, whose outside diameter is smaller than that of the reforming reaction tube 4018, and a catalyst layer 4036 containing a reforming catalyst where metal particles such as nickel or ruthenium are supported on alumina, the catalyst layer 4036 also being housed on a lower side of the casing 4034. An opening 4038 is formed on the top surface of the casing 4034; and the raw fuel and the steam flow into the opening 4038 with the raw fuel and the steam being mixed together. The casing 4034 has ventilation holes provided on the side surfaces so that the reformed gas can pass through the side surfaces of the catalyst layer 4036.

The raw fuel is supplied from the exterior of the fuel cell reforming apparatus 4010 to the catalyst layer 4036 in the reformer 4012 via a raw fuel supply passage 4040 that penetrates the reforming reaction tube 4018, the outer casing 4022 and the heat insulating material 4024. While the raw fuel is being supplied to the catalyst layer 4036, the temperature of the raw fuel is raised by the combustion exhaust gas flowing through the heated flow passage 4032 or reformed gas inside the reforming reaction tube 4018 and, at the same time, the temperature of the reformed gas is lowered thereby.

The raw fuel supply passage 4040 passes through inside the reforming reaction tube 4018, and the desulfurizer 4160 is connected along the raw fuel supply passage 4040. The desulfurizer 4160 is a device that removes sulfur components by the reaction of the raw fuel containing impurities, such as sulfur, and hydrogen in presence of catalyst. In other words, the desulfurizer 4160 is a device utilizing a so-called hydrodesulfurization (HDS) method. Note that the hydrodesulfurization (HDS) method may also be referred to as hydrogenation sulfurization method. In the raw fuel supply passage 4040, a return line (not shown) is connected to an upstream side of the desulfurizer 4160. Here, through this return line a part of hydrogen-rich gas or reformed gas, which has not been used in a fuel cell, is returned to the desulfurizer 4160.

The desulfurizer 4160 desulfurizes a merged gas of raw fuel gas to be supplied and recycled gas containing normally about 10 vol. % of $H_2$ gas of its raw fuel gas. Co—Mo type or Ni—Mo type is used as hydrosulfurization catalyst. Zinc oxide type catalyst is used as an adsorbent material. The raw fuel gas is desulfurized to such an extent that the concentration of sulfur components contained therein is about 20 to 50 ppb in the desulfurized gas. Here, the raw fuel gas is desulfurized by hydrogenation-adsorption desulfurization reaction ($RCH_2SH+H_2 \rightarrow RCH_3+H_2S$, $ZnO+H_2S \rightarrow ZnS+H_2O$).

RSH and COS, which are organic sulfur compounds, are adsorbed onto zinc oxide type catalyst depending on conditions (e.g., at a temperature of 250 to 400° C.) However, the general practice is that the gas is once changed into $H_2S$ on the Ni—Mo type hydrosulfurization catalyst and then $H_2S$ is adsorbed by ZnO. Cu—Zn type catalyst, Ni—Zn type catalyst or the like may be selected suitably as the catalyst in consideration of its operating temperature, cost and the like. The desulfurization reaction temperature of the desulfurizer 4160 according to the ninth embodiment is 350 to 400° C.

The steam required for the reforming reaction in the reformer 4012 is generated from the reforming water supplied from the exterior of the fuel cell reforming apparatus 4010 via a steam supply passage 4042. The reforming water, which is a liquid supplied externally, is evaporated by the heat recovery between the combustion exhaust gas and the reformed gas heated inside the reforming reaction tube 4018 and is then supplied to the catalyst layer 4036 as steam. The reforming water lowers the temperature of the shift reactor 4014 or the selective oxidation unit 4016.

In the fuel cell reforming apparatus 4010 according to the ninth embodiment, the raw fuel supply passage 4040 joins together with the steam supply passage 4042 at a merging part 4044 disposed downstream of a position where the water passing through the steam supply passage 4042 is evaporated. That is, the raw fuel supply passage 4040 joins together with the steam supply passage 4042 on the downstream side of the desulfurizer 4160. This structure prevents the water or steam passing through the steam supply passage 4042 from being mixed into the desulfurizer 4160, so that the degradation of desulfurization performance in the desulfurizer 4160 is suppressed. Inside the outer casing 4022 and the reforming reaction tube 4018, part of the steam supply passage 4042 is of a spirally-wound coil shape. Also, as the surface area of the steam supply passage 4042 becomes larger, the water is more likely to be evaporated. Hence, the steam is produced at least at a lower end of a coil upstream of the merging part 4044.

As with the fuel cell reforming apparatus 4010 according to the ninth embodiment, the raw fuel and the steam join together after the temperature of the raw fuel has risen, due to the combustion exhaust gas heated, in the raw fuel supply passage 4040 and after the water has been evaporated in the steam supply passage 4042, separately. This makes it easy to control the supply of steam as a result of the temperature rise of the raw fuel or the evaporation of water in each supply passage.

The shift reactor 4014 includes a catalyst layer 4046 comprised of pellets made of copper oxide or zinc oxide, for instance, and a divider plate 4048 where holes are so formed as to support the catalyst layer 4046 and transmit the reformed gas from below to above. The shift reactor 4014 can reduce the carbon monoxide by a shift reaction, using the steam contained in the reformed gas, due to the activity of the catalyst layer 4046.

The selective oxidation unit 4016 includes a catalyst layer 4050, comprised of carbon monoxide selective oxidation catalyst, supported on alumina, for instance, and a divider plate 4052 where holes are so formed as to support the catalyst layer 4050 and transmit the reformed gas from below to above. In the selective oxidation unit 4016, the carbon monoxide is combined with oxygen and converted into carbon dioxide through the activity of the catalyst layer 4050 and therefore the concentration of carbon monoxide is further reduced.

In an area between the shift reactor 4014 and the selective oxidation unit 4016 there is disposed a tip part 4056 of an air supply passage 4054 that communicates with the exterior of the fuel cell reforming apparatus 4010 to supply the oxygen to be consumed in the selective oxidation unit 4016. As a result, the air flowing through the tip part 4056 rises together with the reformed gas whose carbon monoxide has been reduced in the shift reactor 4014, thus contributing to the reaction in the selective oxidation unit 4016.

An opening 4058 is formed on the top surface of the reforming reaction tube 4018 above the selective oxidation unit 4016. A reformed gas supply pipe 4060 is connected to the opening 4058. The reformed gas supply pipe 4060 delivers the reformed gas whose carbon monoxide concentration has been sufficiently reduced, to a fuel electrode of a fuel cell (not shown).

An operation of the fuel cell reforming apparatus 4010 according to the ninth embodiment is now described. The combustion exhaust gas produced in the burner 4020 heats up the underside of the reforming reaction tube 4018 and then heats up the side surface thereof as the combustion exhaust gas rises up the heated flow passage 4032. At this time, the catalyst layer 4036 is heated to a temperature range of 600 to 700° C., for instance, required for the reforming reaction, via the reforming reaction tube 4018. Also, the steam supply passage 4042 is directly heated or indirectly heated by the combustion exhaust gas via the reformed reaction tube 4018, so that the reforming water passing through inside thereof is evaporated. At the same time, as the combustion exhaust gas rises up the heated flow passage 4032, the combustion exhaust gas is cooled by the steam supply passage 4042 and the temperature thereof drops gradually. It is to be noted here that the combustion exhaust gas having passed through the heated flow passage 4032 is discharged to the exterior through an exhaust outlet 4062 provided on top of the outer casing 4022.

The steam evaporated in the steam supply passage 4042 and the raw fuel heated in the raw fuel supply passage 4040 are mixed at the merging part 4044 and then sent into the casing 3034 on a lower side thereof. The raw fuel gas containing the steam is gradually heated by the heat of the combustion exhaust gas when passing through inside the catalyst layer 4036, and is changed into a hydrogen-rich reformed gas through a reforming reaction.

The reformed gas produced by reforming the raw fuel gas rises up in the reforming reaction tube 4018 with the flow of the raw fuel gas supplied, and reaches the shift reactor 4014. Here, since the reforming reaction in the reformer 4012 is an endothermic reaction, the reformed gas whose temperature has dropped due to the heat recovery formed in the steam supply passage 4042 reaches the shift reactor 4014. The shift reaction in the shift reactor 4014 is carried out in the range of 200 to 300° C., for instance, and the heat balance is achieved by the heat recovery in the steam supply passage 4042. Thus, an appropriate temperature can be maintained without performing any particular temperature control. As a result, the carbon monoxide in the reformed gas can be reduced in the shift reactor 4014.

If the temperature in the shift reactor 4014 does not become the appropriate temperature, the temperature can be adjusted by adjusting the fuel quantity of the raw fuel in the burner 4020 or varying the number of turns of the spiral-shaped steam supply passage 4042 in the vicinity of the shift reactor 4014.

While the flow through the interior of the reforming reaction tube 4018 is being regulated by a current plate 4064, the reformed gas whose carbon monoxide has been reduced in the shift reactor 4014 rises up further with the flow of the raw fuel gas supplied and then reaches the selective oxidation unit 4016. At this time, the air supplied from the air supply passage 4054 also rises up in the reforming reaction tube 4018 and then reaches the selective oxidation unit 4016.

The selective oxidation unit 4016 is disposed near an inlet 4066 of the steam supply passage 4042, so that the temperature of the reformed gas is lower than that in the shift reactor 4014 because the reformed gas has been cooled by the reforming water. The selective oxidation reaction in the selective oxidation unit 4016 is carried out in the range of 70 to 200° C., for instance, which is lower than the temperature at which the shift reaction is carried out in the shift reactor 4014, and the heat balance is achieved by the heat recovery in the steam supply passage 4042. Thus, the reformed gas can be maintained at an appropriate temperature without performing any particular temperature control. As a result, the carbon monoxide in the reformed gas is further reduced in the selective oxidation unit 4016.

As described above, the fuel cell reforming apparatus 4010 is structured such that the reformer 4012, the shift reactor 4014 and the selective oxidation unit 4016 are housed in a single reforming reaction tube 4018 in this order. Further, the desulfurizer 4160 is also housed therein. Hence, carbon monoxide contained in the reformed gas can be reduced without the formation of an intricately-shaped passage, and the sulfur components can also be removed. Furthermore, as compared with a case when the desulfurizer is provided outside the reforming apparatus, the size of the reforming apparatus as a whole can be made compact when the desulfurizer is provided within the reforming reaction tube. Also, the combustion exhaust gas passes through the heated flow passage 4032 provided between the reforming reaction tube 4018 and the outer casing 4022. As a result, the heat required for the reforming reaction in the reformer 4012 within the reforming reaction tube 4018 can be supplied and therefore a heating means such as a heater is no longer required. Also, a space between the reforming reaction tube 4018 and the outer casing 4022 serves as the heated flow passage 4032. As a result, a passage requiring a many-folded structure with folded-back portions or many tubes is eliminated, so that the fuel cell reforming apparatus 4010 can be realized with a simple structure.

In other words, the passage requiring folded-back portions or many cylindrical structures is eliminated in the fuel cell reforming apparatus 4010 according to the ninth embodiment. As a result, the number of parts required is reduced and the manufacturing process is simplified, thus reducing the overcall cost. Also, the periphery of the outer casing 4022 is covered with the heat insulating material 4024, thus easily securing excellent heat insulating property. Hence, the process necessary for mounting the heat insulating material 4024 can be simplified.

Further, the heated flow passage 4032 is formed in a manner such that the combustion exhaust gas passes through from a reformer 4012 side toward a selective oxidation unit 4016 side. As a result, while heat-exchanging with the reforming reaction tube 4018 or the steam supply passage 4042, the combustion exhaust gas gradually drops its temperature. Thus, the combustion exhaust gas passes through inside the heated flow passage 4032 from the reformer 4012 with a high reaction temperature toward the selective oxidation unit 4016 with a low reaction temperature while the temperature thereof drops appropriately. This enables forming the heated flow passage 4032 in a linear manner, so that no folding back of passage is required and no new heating means is provided.

In the fuel cell reforming apparatus 4010, the combustion exhaust gas passes through the heated flow passage 4032 provided between the reforming reaction tube 4018 and the outer casing 4022 with the result that the heat required for the desulfurization reaction in the desulfurizer 4160 is supplied. Thus, as compared with the case where the desulfurizer 4160 is provided exterior to the reforming apparatus, a heating means such as a heater is no longer necessary. As a result, the thermal efficiency of the apparatus as a whole improves. Also, as compared with the case where the desulfurizer 4160 is provided exterior to the reforming apparatus, the length of the raw fuel supply passage 4040 can be made shorter.

As shown in FIG. 10, the desulfurizer 4160 is provided between the reformer 4012 and the shift reactor 4014. With this structure, the heat required for the desulfurization reaction is supplied through the combustion exhaust gas, which has heated the reformer 4012, and the reformed gas. Accordingly, the fuel cell reforming apparatus 4010 according to the ninth embodiment can efficiently raise the temperature of the desulfurizer 4160 up to a steady temperature of the apparatus in operation.

Tenth Embodiment

Figure 11:
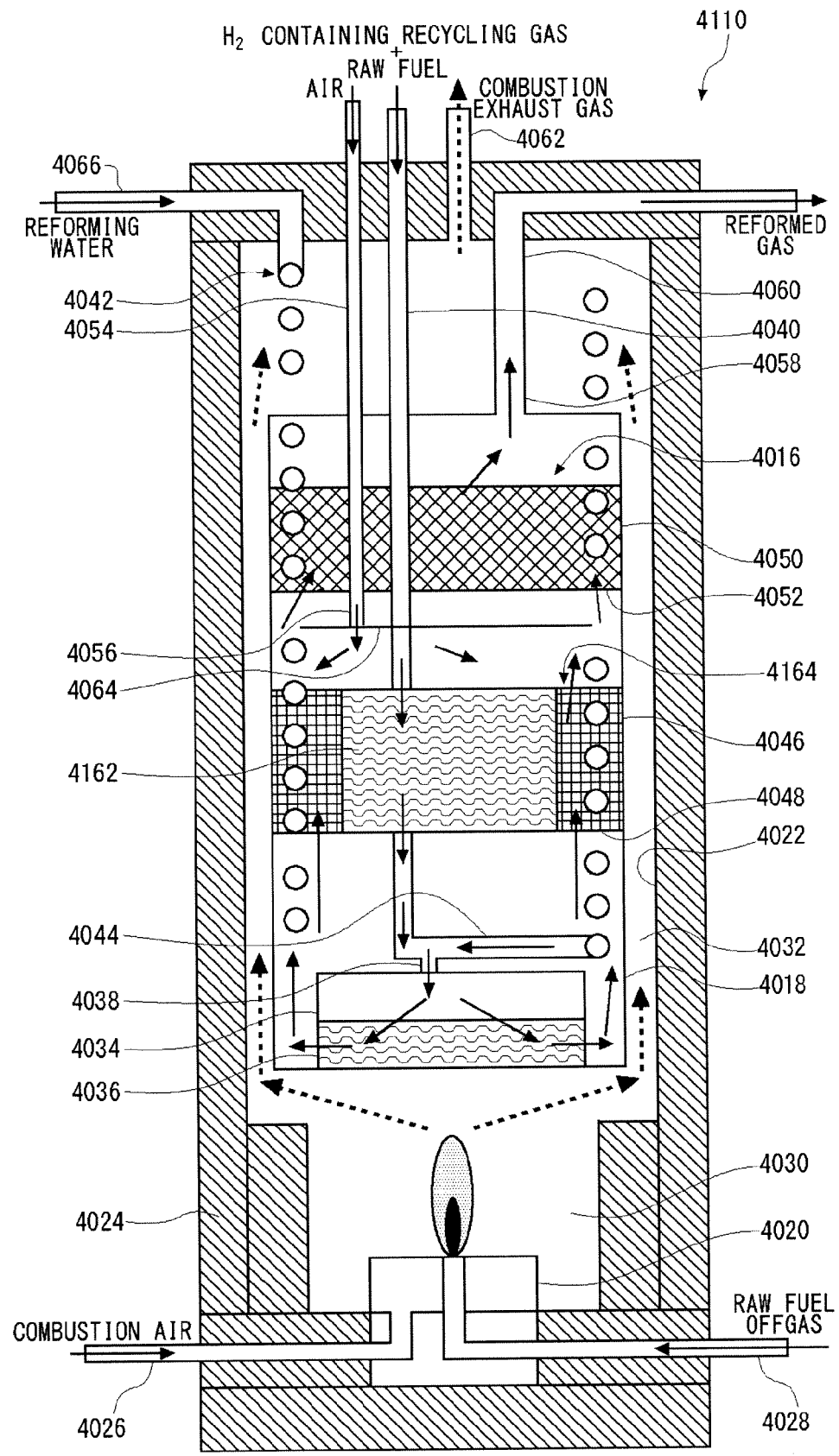
FIG. 11 is a cross-sectional view illustrating a structure of a reforming apparatus for use in a fuel cell according to a tenth embodiment of the present invention.

FIG. 11 is a cross-sectional view illustrating a structure of a reforming apparatus 4110 for use in a fuel cell according to a tenth embodiment of the present invention. In the fuel cell reforming apparatus 4110 according to the tenth embodiment, a desulfurizer 4162 is disposed in such a position that the position thereof in the axial direction of the reforming reaction tube 4018 overlaps with the shift reactor 4164. With this structure, the reforming reaction tube 4018 in the vertical direction is made compact, so that the size of the fuel cell reforming apparatus 4110 can be made smaller. The shift reactor 4164 is formed circular and the desulfurizer 4162 is provided within the inner periphery of the shift reactor 4164. As a result, the fuel cell reforming apparatus 4110 can efficiently raise the temperature of the shift reactor 4164 at a power-on.

The desulfurizer 4162 according to the tenth embodiment is preferably set so that the desulfurization reaction temperature is about 200 to 300° C. In general, the shift reaction temperature in the shift reactor 4164 is about 200 to 300° C. Since the concentration of the sulfur component in the desulfurizer 4162 is a several ppm, the heat generated by the desulfurization reaction is minimal. Also, the shift reactor 4164 and the desulfurizer 4162 are configured in such a manner that they are in contact with each other. Here, the shift reactor 4164 achieves the heat balance by cooling the catalyst layer 4046, which generates the heat due to the shift reaction.

This configuration enables the desulfurizer 4162 to be easily kept at nearly the same temperature range of 200 to 300° C. as the shift reaction temperature.

Eleventh Embodiment

In the fuel cell reforming apparatus according to each of the above-described embodiments, the steam supply passage 4042 is so provided that it passes through inside the reforming reaction tube 4018 and it penetrates the catalyst layer 4046 in the shift reactor 4014 and the catalyst layer 4050 in the selective oxidation unit 4016. Accordingly, the catalyst temperature drops more than necessary in an area of the steam supply passage 4042 directly contacted by the catalyst layer 4050. Thus, there is a possibility that the reaction does not progress sufficiently. In the light of this, the arrangement of the steam supply passage is devised in the eleventh embodiment, thus preventing the temperature of the catalyst layer from dropping more than necessary.

Figure 12:
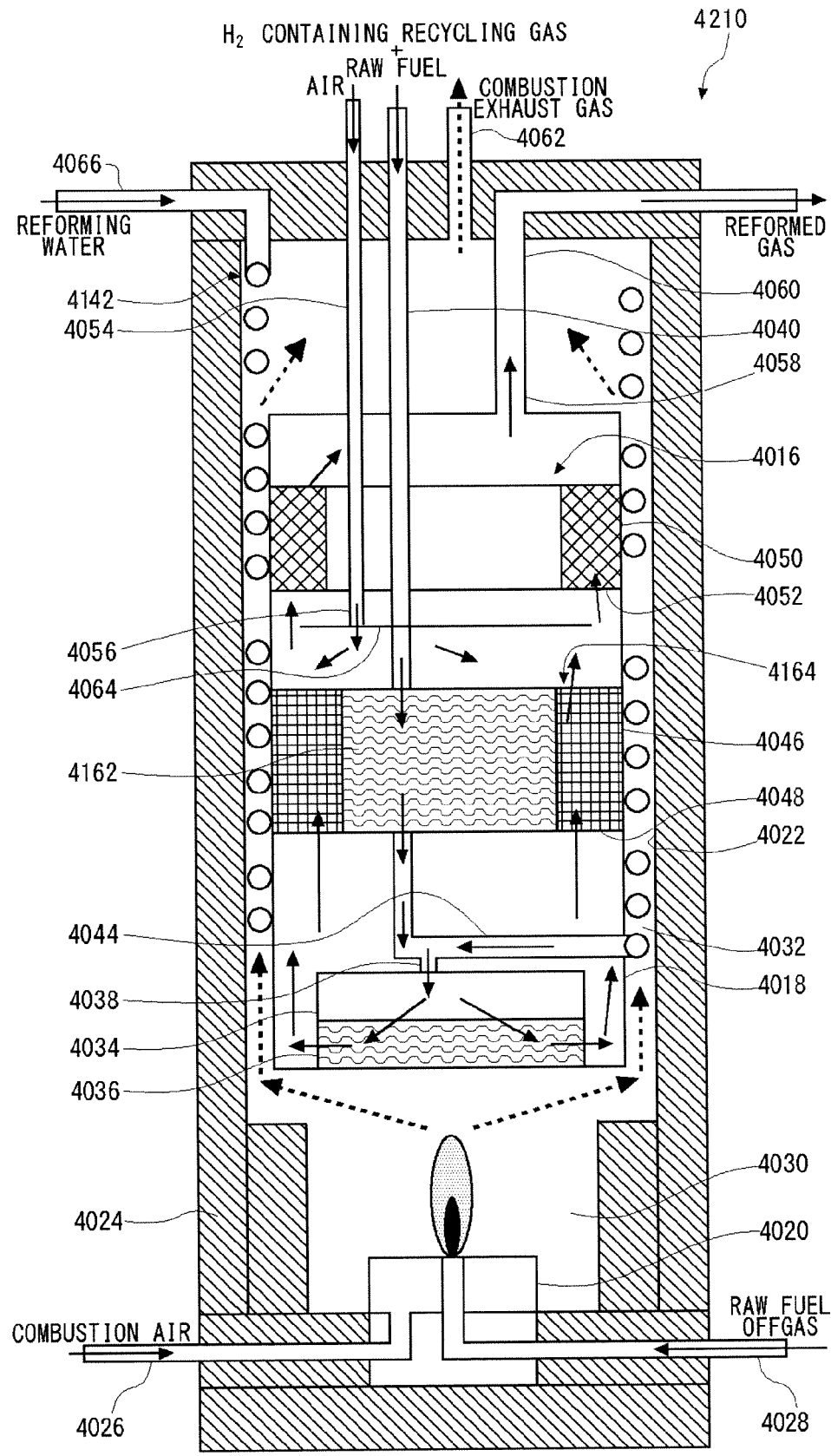
FIG. 12 is a cross-sectional view illustrating a structure of a reforming apparatus for use in a fuel cell according to an eleventh embodiment of the present invention.

FIG. 12 is a cross-sectional view illustrating a structure of a reforming apparatus 4210 for use in a fuel cell according to an eleventh embodiment of the present invention. The fuel cell reforming apparatus 4210 according to the eleventh embodiment differs greatly from the fuel cell reforming apparatus 4010 according to the ninth embodiment in that a steam supply passage 4142 is provided inside a heated flow passage 4032. With this structure, the catalyst layer 4046 in the shift reactor 4014 and the catalyst layer 4050 in the selective oxidation unit 4016 are indirectly cooled by the steam supply passage 4142 through the reforming reaction tube 4018. Hence, this structure and operation prevent the temperature of part of each catalyst layer from dropping excessively. As a result, for instance, the structure realized by the eleventh embodiment prevents the state that carbon monoxide does not react sufficiently in the selective oxidation unit 4016 and the unreacted carbon monoxide is supplied to the fuel electrode of a fuel cell. The steam supply passage 4142 may be so provided as to come in contact with the reforming reaction tube 4018. In such a case, not only the heat recovery from the combustion exhaust gas but also the reaction heat in the catalyst layers 4046 and 4050 is recovered more, and the catalyst layers 4046 and 4050 can be cooled more. The reformed gas in the reforming reaction tube 4018 can also be cooled more.

As with the fuel cell reforming apparatus according to each of the above-described embodiments, suppose that the catalyst layer 4050 in the selective oxidation unit 4016 is of cylindrical shape. If, in this case, the diameter of the catalyst layer 4050 gets larger, the heat of the central part of the catalyst layer may not be removed sufficiently. In such a case, the central part of the catalyst layer 4050 rises to and is kept at high temperatures and it becomes difficult to achieve normal and efficient reaction. In particular, if the steam supply passage 4142 is disposed outside the reforming reaction tube 4018 as with the fuel cell reforming apparatus 4210 according to the eleventh embodiment, there is a strong possibility that the heat is not removed sufficiently. Accordingly, if the temperature of the catalyst layer 4050 in the selective oxidation unit 4016 exceeds an appropriate temperature, a side reaction where the hydrogen in the reformed gas is oxidized may take place.

Thus, in the fuel cell reforming apparatus 4210 according to the eleventh embodiment, the catalyst layer 4050 in the selective oxidation unit 4016 is formed in a ring shape. As a result, the catalyst layer 4050 is structured such that the central part where it is hard to appropriately control the temperature range is hollowed. Thus, the occurrence of undesired side reaction is prevented.

Twelfth Embodiment

Figure 13:
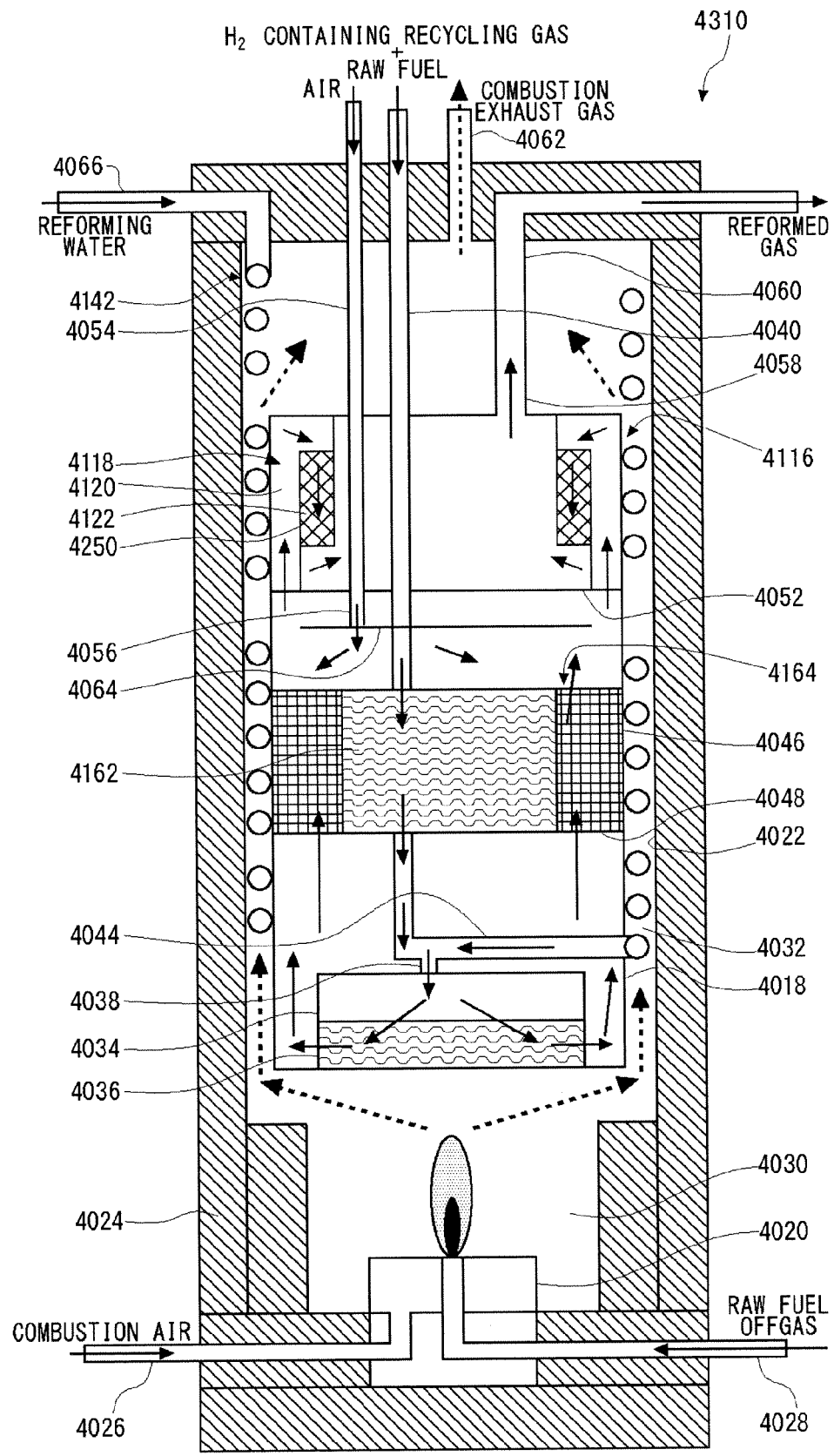
FIG. 13 is a cross-sectional view illustrating a structure of a reforming apparatus for use in a fuel cell according to a twelfth embodiment of the present invention.

FIG. 13 is a cross-sectional view illustrating a structure of a reforming apparatus 4310 for use in a fuel cell according to a twelfth embodiment of the present invention. As described earlier, the catalytic reaction in the selective oxidation unit needs to be carried out in an appropriate temperature range. Normally, the reaction is most active in an inlet side where the reformed gas flows in, so that the temperature of the catalyst layer tends to be high in the inlet side and it tends to be low in an outlet side. Consequently, if the temperature of the reformed gas flowing into the catalyst layer of the selective oxidation is excessively high, the reaction temperature near the inlet of the catalyst layer may be high enough to exceed the appropriate temperature range.

In the light of this, a selective oxidation unit 4116 in the fuel cell reforming apparatus 4310 includes a folded-back passage 4118 and a ring-shaped catalyst layer 250 provided in the folded-back passage 4118. The folded-back passage 4118 is comprised of a first passage 4120 and a second passage 4122. In the first passage 4120, the reformed gas having passed through the shift reactor 4164 flows toward the opposite side of a combustion chamber 4030 side along the inner wall of the reforming reaction tube 4018. The second passage 4122 is folded back on the inside so that the reformed gas having passed through the first passage 4120 travels toward the combustion chamber 4030 side. The catalyst layer 4250 is provided in the second passage 4122.

By employing the structure according to the twelfth embodiment, before the reformed gas reaches the inlet side of the catalyst layer 4250, the heat of the reformed gas is removed, in the first passage 4120, by the low-temperature reformed gas flowing through the steam supply passage 4142 disposed around the first passage 4120. Accordingly, the reaction temperature in the inlet side of the catalyst layer 4250 can be reduced to the appropriate temperature range. The steam supply passage 4142 may be so provided as to come in contact with the first passage 4120. As a result, the temperature of the reformed gas flowing into the inlet side of the catalyst layer 4250 can be further reduced.

Since the first passage 4120 and the second passage 4122 are arranged side by side, it is also possible to recover the reaction heat in the catalyst layer 4250 through the reformed gas. In the second passage 4122, the reformed gas flows through the catalyst layer 4250 toward the fuel chamber 4030 side. Thus, even if the reaction heat in the outlet side of the catalyst layer 4250 is small, the drop in temperature can be suppressed by the reformed gas flowing into the first passage 4120. As a result, the drop in reaction temperature in the outlet side is suppressed wherein, in the catalyst layer 4250, the reaction temperature in the outlet side tends to be lower than that in the inlet side. Hence, the catalyst layer 4250 as a whole is kept in a temperature range appropriate for the catalytic reaction.

Here, the reaction temperature of the catalyst layer 4250 may be kept in the range of 100 to 200° C. The reaction temperature thereof is preferably kept in the range of 120 to 180° C. More preferably, the reaction temperature thereof is kept in the range of 130 to 170° C. The reaction does not progress sufficiently in an area the temperature of which is too low. An unnecessary side reaction takes place first in an area the temperature of which is too high.

According to this twelfth embodiment, the provision of the folded-back passage 4118 makes it possible to have the inlet side of the catalyst layer 4250 in the selective oxidation unit 4116 arranged on a side away from the shift reactor 4014 in the selective oxidation unit 4116. Thus, the distance that the reformed gas, having practically passed through the shift reactor 4014, travels until it reaches the catalyst layer 4250 in the selective oxidation unit 4116 is made longer. In other words, the travelling distance of the reformed gas is made longer without making the distance between the shift reactor 4014 and the selective oxidation unit 4116 longer, namely, without extending the reforming reaction tube 4018 in the longitudinal direction. Thus the temperature of the reformed gas that has reached the inlet side of the catalyst layer 4250 can be reduced. As a result, the fuel cell reforming apparatus 4310 can be made compact in the longitudinal direction thereof.

Though, in the above-described fuel cell reforming apparatus 4110, the desulfurizer 4162 is provided within the inner periphery of the shift reactor 4164, the shift reactor 4164 may be provided within the inner periphery of the desulfurizer 4162. As a result, the fuel cell reforming apparatus 4110 can efficiently raise the temperature of the desulfurizer 4162 at a power-on.

Thirteenth Embodiment

Figure 14:
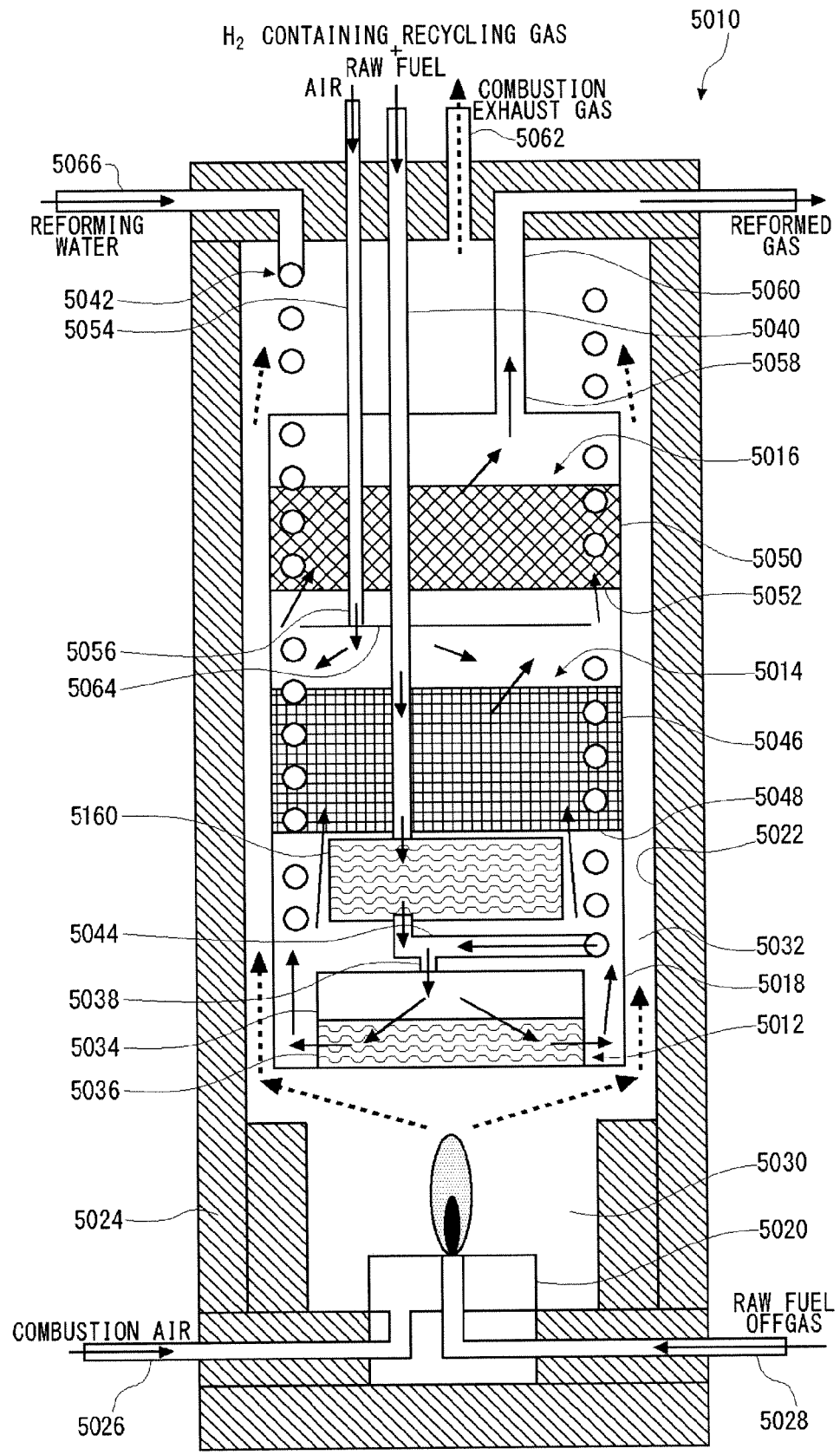
FIG. 14 is a cross-sectional view illustrating a structure of a reforming apparatus for use in a fuel cell according to a thirteenth embodiment of the present invention.

FIG. 14 is a cross-sectional view illustrating a structure of a reforming apparatus 5010 for use in a fuel cell according to a thirteenth embodiment of the present invention. The fuel cell reforming apparatus 5010 produces hydrogen-rich reformed gas by subjecting the raw fuel, such as methane, propane and butane, to steam reforming.

The fuel cell reforming apparatus 5010 includes a reformer 5012 for producing the reformed gas from the raw fuel, a shift reactor 5014 for reducing the carbon monoxide contained in the reformed gas through a shift reaction, a selective oxidation unit 5016 for reducing the carbon monoxide contained in the reformed gas which has passed through the shift reactor 5014 by performing selective oxidation on said carbon monoxide through a selective oxidation reaction, a reforming reaction tube 5018 which houses linearly the reformer 5012, the shift reactor 5014 and the selective oxidation unit 5016 in this order and which further houses a desulfurizer 5160, a burner 5020, as a combustion means for generating combustion exhaust gas by combusting the raw fuel, and an outer casing 5022, disposed coaxially around the reforming reaction tube 5018, having a larger diameter than that of the reforming reaction tube 5018. The periphery of the outer casing 5022 is covered with a heat insulating material 5024 except for portions where a plurality of pipings communicate with the exterior.

In the burner 5020, the air taken in from an air inlet 5026 and the raw fuel offgas taken in from a fuel inlet 5028 are mixed together so as to be combusted. The combustion of the raw fuel gas by the burner 5020 produces the high-temperature combustion exhaust gas of 1200 to 1300° C. The burner 5020 is placed in a combustion chamber 5030 formed at one end of a reformer 5012 side of the reforming reaction tube 5018, and is fixed to a lower part of the outer casing 5022. As a result, the combustion exhaust gas produced in the burner 5020 can be immediately used for the reforming reaction in the reformer 5012. Thus the thermal efficiency can be enhanced.

A heated flow passage 5032, through which the aforementioned combustion exhaust gas passes to heat the reforming reaction tube 5018, is formed between the reforming reaction tube 5018 and the outer casing 5022.

The reformer 5012 includes a casing 5034, provided on the bottom of the reforming reaction tube 5018, whose outside diameter is smaller than that of the reforming reaction tube 5018, and a catalyst layer 5036 containing a reforming catalyst where metal particles such as nickel or ruthenium are supported on alumina, the catalyst layer 5036 also being housed on a lower side of the casing 5034. An opening 5038 is formed on the top surface of the casing 5034; and the raw fuel and the steam flow into the opening 5038 with the raw fuel and the steam being mixed together. The casing 5034 has ventilation holes provided on the side surfaces so that the reformed gas can pass through the side surfaces of the catalyst layer 5036.

The raw fuel is supplied from the exterior of the fuel cell reforming apparatus 5010 to the catalyst layer 5036 in the reformer 5012 via a raw fuel supply passage 5040 that penetrates the reforming reaction tube 5018, the outer casing 5022 and the heat insulating material 5024. While the raw fuel is being supplied to the catalyst layer 5036, the temperature of the raw fuel is raised by the combustion exhaust gas flowing through the heated flow passage 5032 or reformed gas inside the reforming reaction tube 5018 and, at the same time, the temperature of the reformed gas is lowered thereby.

The raw fuel supply passage 5040 passes through inside the reforming reaction tube 5018, and the desulfurizer 5160 is connected along the raw fuel supply passage 5040. The desulfurizer 5160 is a device that removes sulfur components by the reaction of the raw fuel containing impurities, such as sulfur, and hydrogen in presence of catalyst. In other words, the desulfurizer 5160 is a device utilizing a so-called hydrodesulfurization (HDS) method. Note that the hydrodesulfurization (HDS) method may also be referred to as hydrogenation sulfurization method. In the raw fuel supply passage 5040, after-mentioned reformed-gas return passage (not shown) is connected to an upstream side of the desulfurizer 5160. Here, through this return line a part of hydrogen-rich gas or reformed gas, which has not been used in a fuel cell, is returned to the desulfurizer 5160.

The desulfurizer 5160 desulfurizes a merged gas of raw fuel gas to be supplied and recycled gas containing normally about 10 vol. % of $H_2$ gas of its raw fuel gas. Co—Mo type or Ni—Mo type is used as hydrosulfurization catalyst. Zinc oxide type catalyst is used as an adsorbent material. The raw fuel gas is desulfurized to such an extent that the concentration of sulfur components contained therein is about 20 to 50 ppb in the desulfurized gas. Here, the raw fuel gas is desulfurized by hydrogenation-adsorption desulfurization reaction ($RCH_2SH+H_2 \rightarrow RCH_3+H_2S$, $ZnO+H_2S \rightarrow ZnS+H_2O$).

RSH and COS, which are organic sulfur compounds, are adsorbed onto zinc oxide type catalyst depending on conditions (e.g., at a temperature of 250 to 400° C.) However, the general practice is that the gas is once changed into $H_2S$ on the Co—Mo type or Ni—Mo type hydrosulfurization catalyst and then $H_2S$ is adsorbed by ZnO. Cu—Zn type catalyst, Ni—Zn type catalyst or the like may be selected suitably as the catalyst in consideration of its operating temperature, cost and the like. The desulfurization reaction temperature of the desulfurizer 5160 according to the thirteenth embodiment is 350 to 400° C.

The steam required for the reforming reaction in the reformer 5012 is generated from the reforming water supplied from the exterior of the fuel cell reforming apparatus 5010 via a steam supply passage 5042. The reforming water, which is a liquid supplied externally, is evaporated by the heat recovery between the combustion exhaust gas and the reformed gas heated inside the reforming reaction tube 5018 and is then supplied to the catalyst layer 5036 as steam. The reforming water lowers the temperature of the shift reactor 5014 or the selective oxidation unit 5016.

In the fuel cell reforming apparatus 5010 according to the thirteenth embodiment, the raw fuel supply passage 5040 joins together with the steam supply passage 5042 at a merging part 5044 disposed downstream of a position where the water passing through the steam supply passage 5042 is evaporated. That is, the raw fuel supply passage 5040 joins together with the steam supply passage 5042 on the downstream side of the desulfurizer 5160. This structure prevents the water or steam passing through the steam supply passage 5042 from being mixed into the desulfurizer 5160, so that the degradation of desulfurization performance in the desulfurizer 5160 is suppressed. Inside the outer casing 5022 and the reforming reaction tube 5018, part of the steam supply passage 5042 is of a spirally-wound coil shape. Also, as the surface area of the steam supply passage 5042 becomes larger, the water is more likely to be evaporated. Hence, the steam is produced at least at a lower end of a coil upstream of the merging part 5044.

As with the fuel cell reforming apparatus 5010 according to the thirteenth embodiment, the raw fuel and the steam join together after the temperature of the raw fuel has risen, due to the combustion exhaust gas heated, in the raw fuel supply passage 5040 and after the water has been evaporated in the steam supply passage 5042, separately. This makes it easy to control the supply of steam as a result of the temperature rise of the raw fuel or the evaporation of water in each supply passage.

The shift reactor 5014 includes a catalyst layer 5046 comprised of pellets made of copper oxide or zinc oxide, for instance, and a divider plate 5048 where holes are so formed as to support the catalyst layer 5046 and transmit the reformed gas from below to above. The shift reactor 5014 can reduce the carbon monoxide by a shift reaction, using the steam contained in the reformed gas, due to the activity of the catalyst layer 5046.

The selective oxidation unit 5016 includes a catalyst layer 5050, comprised of carbon monoxide selective oxidation catalyst, supported on alumina, for instance, and a divider plate 5052 where holes are so formed as to support the catalyst layer 5050 and transmit the reformed gas from below to above. In the selective oxidation unit 5016, the carbon monoxide is combined with oxygen and converted into carbon dioxide through the activity of the catalyst layer 5050 and therefore the concentration of carbon monoxide is further reduced.

In an area on a downstream side of the shift reactor 5014 and an upstream side of the selective oxidation unit 5016, there is disposed a tip part 5056 of an air supply passage 5054 that communicates with the exterior of the fuel cell reforming apparatus 5010 to supply the oxygen to be consumed in the selective oxidation unit 5016. As a result, the air flowing through the tip part 5056 rises together with the reformed gas whose carbon monoxide has been reduced in the shift reactor 5014, thus contributing to the reaction in the selective oxidation unit 5016.

An opening 5058 is formed on the top surface of the reforming reaction tube 5018 above the selective oxidation unit 5016. A reformed gas supply pipe 5060 is connected to the opening 5058. The reformed gas supply pipe 5060 delivers the reformed gas whose carbon monoxide concentration has been sufficiently reduced, to a fuel electrode of a fuel cell (not shown).

An operation of the fuel cell reforming apparatus 5010 according to the thirteenth embodiment is now described. The combustion exhaust gas produced in the burner 5020 heats up the underside of the reforming reaction tube 5018 and then heats up the side surface thereof as the combustion exhaust gas rises up the heated flow passage 5032. At this time, the catalyst layer 5036 is heated to a temperature range of 600 to 700° C., for instance, required for the reforming reaction, via the reforming reaction tube 5018. Also, the steam supply passage 5042 is directly heated or indirectly heated by the combustion exhaust gas via the reformed reaction tube 5018, so that the reforming water passing through inside thereof is evaporated. At the same time, as the combustion exhaust gas rises up the heated flow passage 5032, the combustion exhaust gas is cooled by the steam supply passage 5042 and the temperature thereof drops gradually. It is to be noted here that the combustion exhaust gas having passed through the heated flow passage 4032 is discharged to the exterior through an exhaust outlet 5062 provided on top of the outer casing 5022.

The steam evaporated in the steam supply passage 4042 and the raw fuel heated in the raw fuel supply passage 4040 are mixed at the merging part 4044 and then sent into the casing 3034 on a lower side thereof. The raw fuel gas containing the steam is gradually heated by the heat of the combustion exhaust gas when passing through inside the catalyst layer 4036, and is changed into a hydrogen-rich reformed gas through a reforming reaction.

The reformed gas produced by reforming the raw fuel gas rises up in the reforming reaction tube 5018 with the flow of the raw fuel gas supplied, and reaches the shift reactor 5014. Here, since the reforming reaction in the reformer 5012 is an endothermic reaction, the reformed gas whose temperature has dropped due to the heat recovery formed in the steam supply passage 5042 reaches the shift reactor 5014. The shift reaction in the shift reactor 5014 is carried out in the range of 200 to 300° C., for instance, and the heat balance is achieved by the heat recovery in the steam supply passage 5042. Thus, an appropriate temperature can be maintained without performing any particular temperature control. As a result, the carbon monoxide in the reformed gas can be reduced in the shift reactor 5014.

If the temperature in the shift reactor 5014 does not become the appropriate temperature, the temperature can be adjusted by adjusting the fuel quantity of the raw fuel in the burner 5020 or varying the number of turns of the spiral-shaped steam supply passage 5042 in the vicinity of the shift reactor 5014.

While the flow through the interior of the reforming reaction tube 5018 is being regulated by a current plate 5064, the reformed gas whose carbon monoxide has been reduced in the shift reactor 5014 rises up further with the flow of the raw fuel gas supplied and then reaches the selective oxidation unit 5016. At this time, the air supplied from the air supply passage 5054 also rises up in the reforming reaction tube 5018 and then reaches the selective oxidation unit 5016.

The selective oxidation unit 5016 is disposed near an inlet 5066 of the steam supply passage 5042, so that the temperature of the reformed gas is lower than that in the shift reactor 5014 because the reformed gas has been cooled by the reforming water. The selective oxidation reaction in the selective oxidation unit 5016 is carried out in the range of 70 to 200° C., for instance, which is lower than the temperature at which the shift reaction is carried out in the shift reactor 5014, and the heat balance is achieved by the heat recovery in the steam supply passage 5042. Thus, the reformed gas can be maintained at an appropriate temperature without performing any particular temperature control. As a result, the carbon monoxide in the reformed gas is further reduced in the selective oxidation unit 5016.

As described above, the fuel cell reforming apparatus 5010 is structured such that the reformer 5012, the shift reactor 5014 and the selective oxidation unit 5016 are housed in a single reforming reaction tube 5018 in this order. Further, the desulfurizer 5160 is also housed therein. Hence, carbon monoxide contained in the reformed gas can be reduced without the formation of an intricately-shaped passage, and the sulfur components can also be removed. Furthermore, as compared with a case where the desulfurizer is provided outside the reforming apparatus, the size of the reforming apparatus as a whole can be made compact if the desulfurizer is provided within the reforming reaction tube. Also, the combustion exhaust gas passes through the heated flow passage 5032 provided between the reforming reaction tube 5018 and the outer casing 5022. As a result, the heat required for the reforming reaction in the reformer 5012 within the reforming reaction tube 5018 can be supplied and therefore a heating means such as a heater is no longer required. Also, a space between the reforming reaction tube 5018 and the outer casing 5022 serves as the heated flow passage 5032. As a result, a passage requiring a many-folded structure with folded-back portions or many tubes is eliminated, so that the fuel cell reforming apparatus 5010 can be realized with a simple structure.

In other words, the passage requiring folded-back portions or many cylindrical structures is eliminated in the fuel cell reforming apparatus 5010 according to the thirteenth embodiment. As a result, the number of parts required is reduced and the manufacturing process is simplified, thus reducing the overcall cost. Also, the periphery of the outer casing 5022 is covered with the heat insulating material 5024, thus easily securing excellent heat insulating property. Hence, the process necessary for mounting the heat insulating material 5024 can be simplified.

Further, the heated flow passage 5032 is formed in a manner such that the combustion exhaust gas passes through from a reformer 5012 side toward a selective oxidation unit 5016 side. As a result, while heat-exchanging with the reforming reaction tube 5018 or the steam supply passage 5042, the combustion exhaust gas gradually drops its temperature. Thus, the combustion exhaust gas passes through inside the heated flow passage 5032 from the reformer 5012 with a high reaction temperature toward the selective oxidation unit 5016 with a low reaction temperature while the temperature thereof drops appropriately. This enables the formation of the heated flow passage 5032 in a linear manner, so that no folding back of passage is required and no new heating means is provided.

In the fuel cell reforming apparatus 5010, the combustion exhaust gas passes through the heated flow passage 5032 provided between the reforming reaction tube 5018 and the outer casing 5022 with the result that the heat required for the desulfurization reaction in the desulfurizer 5160 is supplied. Thus, as compared with the case where the desulfurizer 5160 is provided exterior to the reforming apparatus, a heating means such as a heater is no longer necessary. As a result, the thermal efficiency of the apparatus as a whole improves. Also, as compared with the case where the desulfurizer 5160 is provided exterior to the reforming apparatus, the length of the raw fuel supply passage 5040 can be made shorter.

As shown in FIG. 14, the desulfurizer 5160 is provided between the reformer 5012 and the shift reactor 5014. With this structure, the heat required for the desulfurization reaction is supplied through the combustion exhaust gas, which has heated the reformer 5012, and the reformed gas. Accordingly, the fuel cell reforming apparatus 5010 according to the thirteenth embodiment can efficiently raise the temperature of the desulfurizer 5160 up to a steady temperature of the apparatus in operation.

Fourteenth Embodiment

Figure 15:
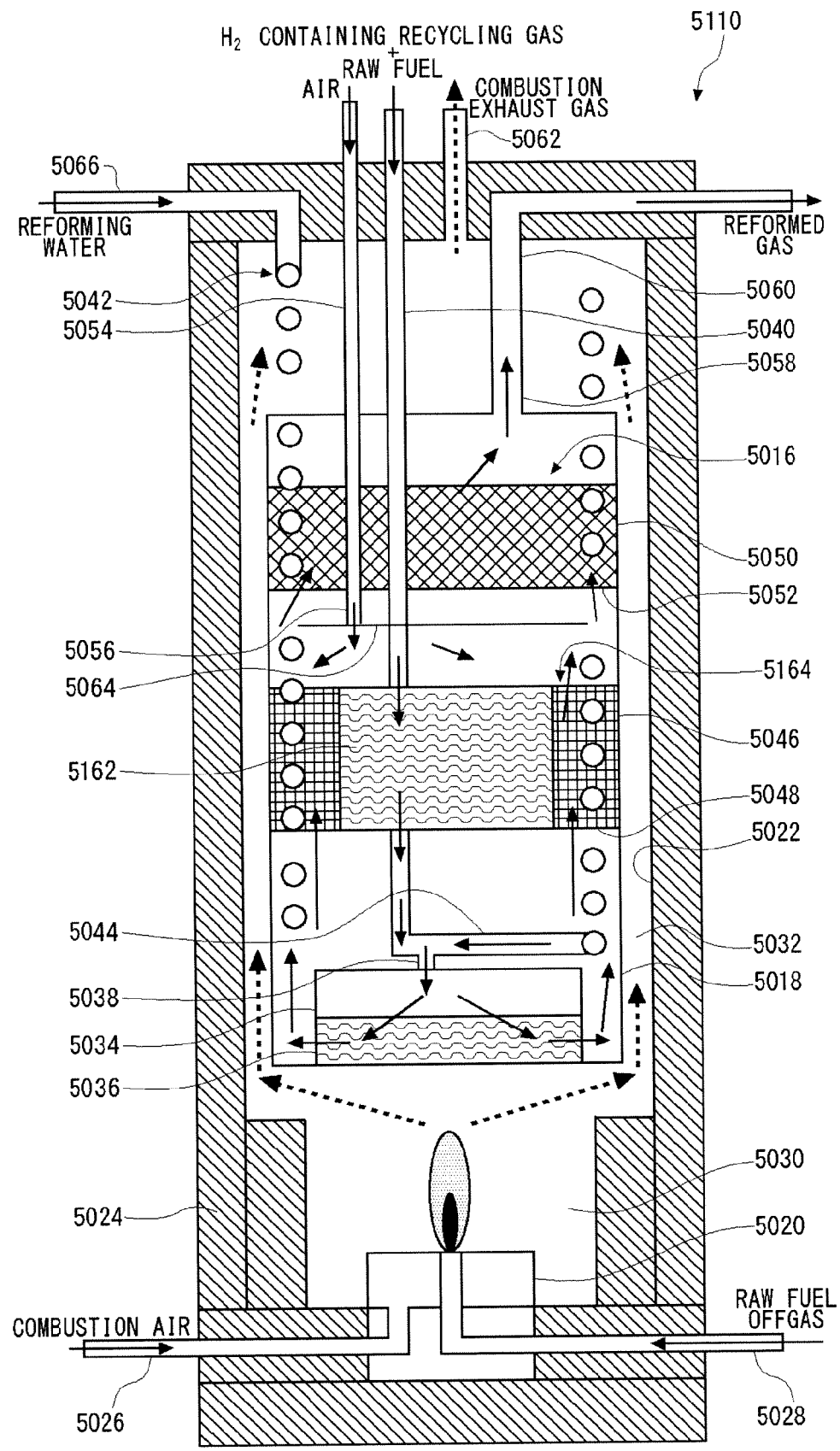
FIG. 15 is a cross-sectional view illustrating a structure of a reforming apparatus for use in a fuel cell according to a fourteenth embodiment of the present invention.

FIG. 15 is a cross-sectional view illustrating a structure of a reforming apparatus 5110 for use in a fuel cell according to a fourteenth embodiment of the present invention. In the fuel cell reforming apparatus 5110 according to the fourteenth embodiment, a desulfurizer 5162 is disposed in such a position that the position thereof in the axial direction of the reforming reaction tube 5018 overlaps with the shift reactor 5164. With this structure, the reforming reaction tube 5018 in the vertical direction is made compact, so that the size of the fuel cell reforming apparatus 5110 can be made smaller. The shift reactor 5164 is formed circular and the desulfurizer 5162 is provided within the inner periphery of the shift reactor 5164. As a result, the fuel cell reforming apparatus 5110 can efficiently raise the temperature of the shift reactor 5164 at a power-on.

The desulfurizer 5162 according to the fourteenth embodiment is preferably set so that the desulfurization reaction temperature is about 200 to 300° C. In general, the shift reaction temperature in the shift reactor 5164 is about 200 to 300° C. Since the concentration of the sulfur component in the desulfurizer 5162 is a several ppm, the heat generated by the desulfurization reaction is minimal. Also, the shift reactor 5164 and the desulfurizer 4162 are configured in such a manner that they are in contact with each other. Here, the shift reactor 5164 achieves the heat balance by cooling the catalyst layer 5046, which generates the heat due to the shift reaction. This configuration enables the desulfurizer 5162 to be easily kept at nearly the same temperature range of 200 to 300° C. as the shift reaction temperature.

Fifteenth Embodiment

Figure 16:
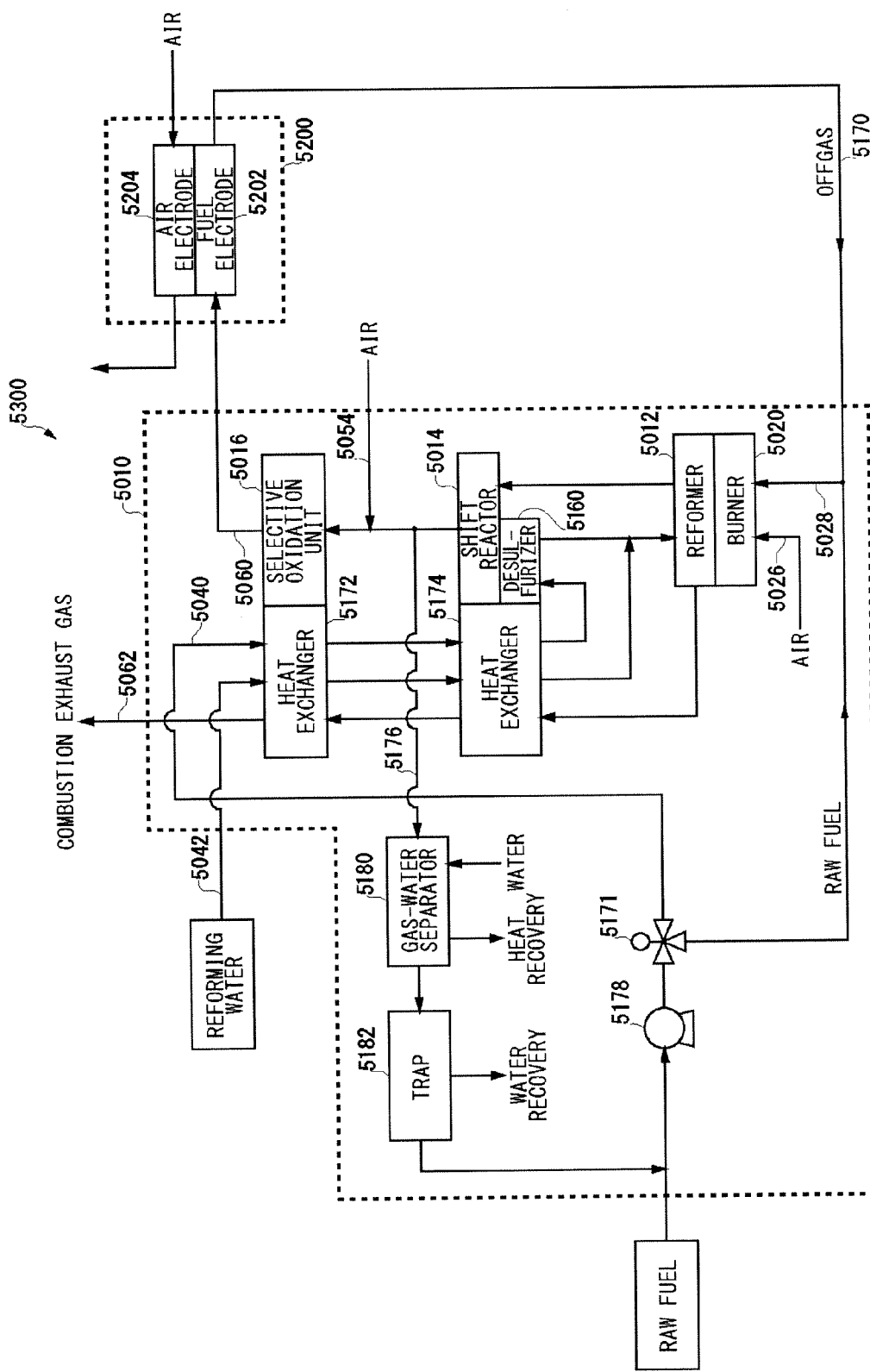
FIG. 16 schematically illustrates a rough structure of a fuel cell system according to a fifteenth embodiment of the present invention.

A description is hereinbelow given of a flow of the reformed gas, water, air and the like in a fuel cell system using the fuel cell reforming apparatus 5010 according to the fourteenth embodiment. FIG. 16 schematically illustrates a rough structure of a fuel cell system 5300 according to a fifteenth embodiment of the present invention. A description is hereinbelow given principally of a reformed-gas return passage through which part of the reformed gas produced in the reformer is returned to the desulfurizer. Each component which has already been explained in the thirteenth embodiment is given the identical reference numerals and the repeated description thereof is omitted as appropriate.

The fuel cell system 5300 includes a reforming apparatus 5010 for use in a fuel cell, and a fuel cell 5200. The fuel cell 5200 includes a fuel electrode 5202 and an air electrode 5204. The reformed gas is supplied to the fuel electrode 5202 via the reformed gas supply pipe 5060, whereas the air is supplied to the air electrode 5204 via an air pump. A chemical reaction is induced between the hydrogen gas in the reformed gas and the oxygen gas in the air via an ion-exchange membrane (solid polymer electrolyte membrane, for instance) so as to generate an electromotive force and produce water. The reformed gas which has not been consumed in the fuel electrode 5202 is supplied, as offgas, from the fuel inlet 5028 to the burner 5020 via the offgas supply passage 5170. The raw fuel is supplied to the burner 5020, as appropriate, from a pipe branched from a valve 5171 provided along the raw fuel supply passage 5040.

The fuel cell reforming apparatus 5010 includes a steam supply passage 5042, a raw fuel supply passage 5040, and a reformed gas return passage 5176. In the steam supply passage 5042, the water is evaporated in heat exchangers 5172 and 5174 and the like by using a combustion exhaust gas as a heating medium to supply the steam to the reformer 5012. The raw fuel supply passage 5040 passes through inside the reforming reaction tube 5018, and the desulfurizer 5160 is connected along the raw fuel supply passage 5040. In the raw fuel supply passage 5040, the temperature of the raw fuel is raised in the heat exchangers 5172 and 5174 and the like by using a combustion exhaust gas as a heating medium to supply the raw fuel, whose temperature has been raised, to the reformer 5012. The reformed gas return passage 5176 returns part of the reformed gas produced in the reformer 5012 to the desulfurizer 5160 wherein the reformed gas return passage 5176 is connected upstream of the desulfurizer 5160 connected along the raw fuel supply passage 5040.

The reformed gas return passage 5176 is configured such that part of reformed gas flows from an upstream side of the air supply passage 5054. Accordingly, the air containing oxygen is less likely to be mixed into the reformed gas return passage 5176. As a result, the oxidation of catalyst in the desulfurizer 5160 is suppressed.

The fuel cell reforming apparatus 5010 according to the fourteenth embodiment further includes a pump 5178, connected to the raw fuel supply passage 5040, which delivers the raw fuel toward the raw fuel supply passage 5040, and a gas-water separator 5180, provided along the reformed gas return passage 5176, which removes the moisture contained in the reformed gas. The reformed gas return passage 5176 is connected to a suction side of the pump 5178.

The heat exchanger which functions as the gas-water separator 5180 uses the reforming water as a coolant. The high-temperature reformed gas passing through the reformed gas return passage 5176 is cooled in the gas-water separator 5180 and the moisture contained therein is liquefied. Thus the reformed gas is recovered as water from a trap 5182, so that the moisture thereof is removed. In this manner, the moisture contained in the reformed gas in the reformed gas return passage 5176 is removed through the activity of the gas-water separator 5180 and then the reformed gas is delivered toward the raw fuel supply passage 5040 by the pump 5178. As a result, blocking the flow of the raw fuel because of the condensed water staying in the raw fuel supply passage 5040 is prevented. Also, the deterioration of catalyst caused by the fact that the moisture as well as the raw fuel has reached the desulfurizer 5160 is suppressed.

Sixteenth Embodiment

Figure 17:
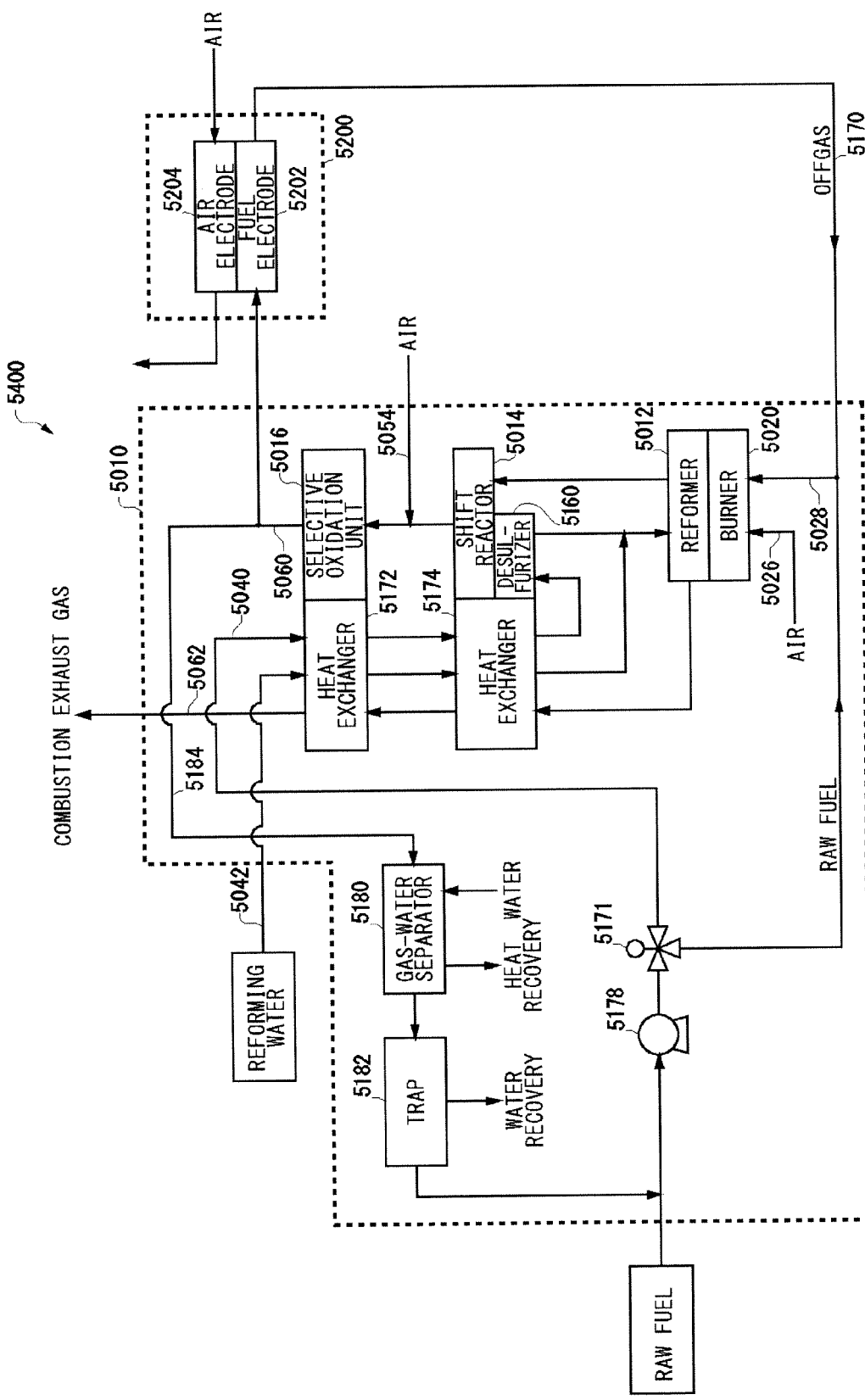
FIG. 17 schematically illustrates a rough structure of a fuel cell system according to a sixteenth embodiment of the present invention.

FIG. 17 schematically illustrates a rough structure of a fuel cell system 5400 according to a sixteenth embodiment of the present invention. A description is hereinbelow given principally of a reformed-gas return passage 5184 through which part of the reformed gas produced in the reformer is returned to the desulfurizer. Similar elements to those shown in FIG. 16 are omitted as appropriate.

The fuel cell system 5400 includes a reforming apparatus 5010 for use in a fuel cell, and a fuel cell 5200. The fuel cell reforming apparatus 5010 includes a steam supply passage 5042, a raw fuel supply passage 5040, and a reformed gas return passage 5184. In the steam supply passage 5042, the water is evaporated in heat exchangers 5172 and 5174 and the like by using a combustion exhaust gas as a heating medium to supply the steam to the reformer 5012. The raw fuel supply passage 5040 passes through inside the reforming reaction tube 5018, and the desulfurizer 5160 is connected along the reforming reaction tube 5018. In the raw fuel supply passage 5040, the temperature of the raw fuel is raised in the heat exchangers 5172 and 5174 and the like by using a combustion exhaust gas as a heating medium to supply the raw fuel, whose temperature has been raised, to the reformer 5012. The reformed gas return passage 5184 returns part of the reformed gas produced in the reformer 5012 to the desulfurizer 5160 wherein the reformed gas return passage 5184 is connected upstream of the desulfurizer 5160 connected along the raw fuel supply passage 5040.

The reformed gas return passage 5184 is configured such that part of reformed gas flows along the reformed gas supply pipe 5060 downstream of the selective oxidation unit 5016. With this structure, the reformed gas return passage 5184 no longer needs to be provided within the reforming reaction tube 5018 and therefore piping is done easily.

The fuel cell reforming apparatus 5010 according to the sixteenth embodiment further includes a pump 5178, connected to the raw fuel supply passage 5040, which pumps the raw fuel toward the raw fuel supply passage 5040, and a gas-water separator 5180, provided along the reformed gas return passage 5176, which removes the moisture contained in the reformed gas. The reformed gas return passage 5184 is connected to a suction side of the pump 5178.

The heat exchanger which functions as the gas-water separator 5180 uses the reforming water as a coolant. The high-temperature reformed gas passing through the reformed gas return passage 5184 is cooled in the gas-water separator 5180 and the moisture contained therein is liquefied. Thus the moisture contained therein is recovered as water from a trap 5182, so that the moisture thereof is removed. In this manner, the moisture contained in the reformed gas in the reformed gas return passage 5184 is removed through the activity of the gas-water separator 5180 and then the reformed gas is pumped toward the raw fuel supply passage 5040 by the pump 5178. As a result, blocking the flow of the raw fuel because of the condensed water staying in the raw fuel supply passage 5040 is prevented. Also, the deterioration of catalyst caused by the fact that the moisture as well as the raw fuel has reached the desulfurizer 5160 is suppressed.

Seventeenth Embodiment

Figure 18:
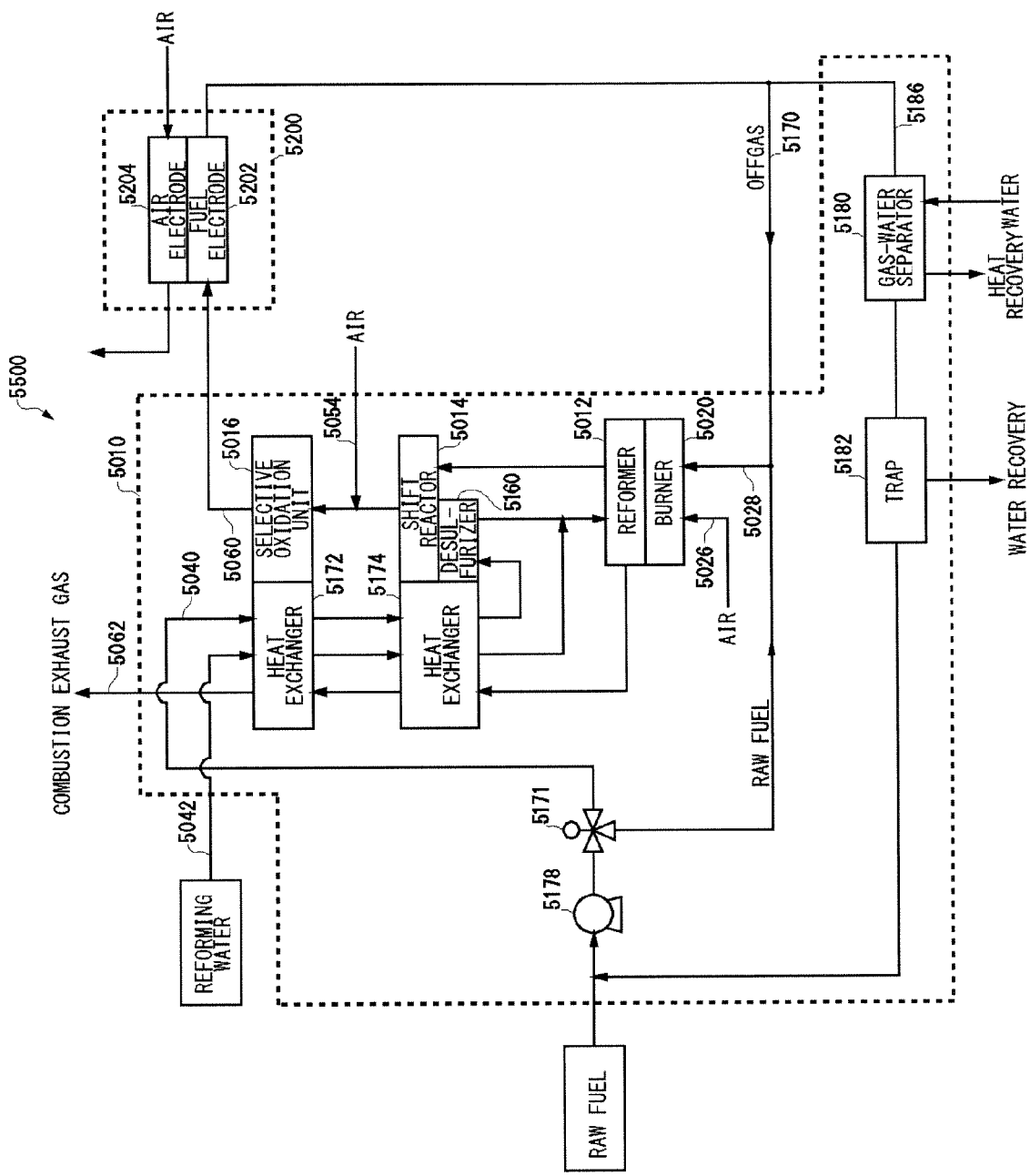
FIG. 18 schematically illustrates a rough structure of a fuel cell system according to a seventeenth embodiment of the present invention.

FIG. 18 schematically illustrates a rough structure of a fuel cell system 5500 according to a seventeenth embodiment of the present invention. A description is hereinbelow given principally of a reformed-gas return passage 5186 through which part of the reformed gas produced in the reformer is returned to the desulfurizer. Similar elements to those shown in FIG. 16 are omitted as appropriate.

The fuel cell system 5500 includes a reforming apparatus 5010 for use in a fuel cell, and a fuel cell 5200. The fuel cell reforming apparatus 5010 includes a steam supply passage 5042, a raw fuel supply passage 5040, and a reformed gas return passage 5186. In the steam supply passage 5042, the water is evaporated in heat exchangers 5172 and 5174 and the like by using a combustion exhaust gas as a heating medium to supply the steam to the reformer 5012. The raw fuel supply passage 5040 passes through inside the reforming reaction tube 5018, and the desulfurizer 5160 is connected along the raw fuel supply passage 5040. In the raw fuel supply passage 5040, the temperature of the raw fuel is raised in the heat exchangers 5172 and 5174 and the like by using a combustion exhaust gas as a heating medium to supply the raw fuel, whose temperature has been raised, to the reformer 5012. The reformed gas return passage 5186 returns part of the reformed gas produced in the reformer 5012 to the desulfurizer 5160 wherein the reformed gas return passage 5186 is connected upstream of the desulfurizer 5160 connected along the raw fuel supply passage 5040.

The reformed gas return passage 5186 is configured such that part of reformed gas flows from the offgas supply passage 5170. With this structure, the offgas containing hydrogen can be used more effectively and piping is done easily.

The fuel cell reforming apparatus 5010 according to the seventeenth embodiment further includes a pump 5178, connected to the raw fuel supply passage 5040, which pumps the raw fuel toward the raw fuel supply passage 5040, and a gas-water separator 5180, provided along the reformed gas return passage 5186, which removes the moisture contained in the reformed gas. The reformed gas return passage 5186 is connected to a suction side of the pump 5178.

The heat exchanger which functions as the gas-water separator 5180 uses the reforming water as a coolant. The high-temperature reformed gas passing through the reformed gas return passage 5186 is cooled in the gas-water separator 5180 and the moisture contained therein is liquefied. Thus the moisture contained therein is recovered as water from a trap 5182, so that the moisture thereof is removed. In this manner, the moisture contained in the reformed gas in the reformed gas return passage 5186 is removed through the activity of the gas-water separator 5180 and then the reformed gas is delivered toward the raw fuel supply passage 5040 by the pump 5178. As a result, blocking the flow of the raw fuel because of the condensed water staying in the raw fuel supply passage 5040 is prevented. Also, the deterioration of catalyst caused by the fact that the moisture as well as the raw fuel has reached the desulfurizer 5160 is suppressed.

In the above-described fuel cell reforming apparatus 5110, the desulfurizer 5162 is provided within the inner periphery of the shift reactor 4564. As a modification, the shift reactor 5164 may be provided within the inner periphery of the desulfurizer 5162. This enables the fuel cell reforming apparatus 4110 to efficiently raise the temperature of the desulfurizer 5162 at a power-on.

The present invention has been described by referring to each of the above-described embodiments. However, the present invention is not limited to the above-described embodiments only, and those resulting from any combination of them or substitution as appropriate are also within the scope of the present invention. Also, it is understood that various modifications such as changes in design may be made based on the knowledge of those skilled in the art, and the embodiments added with such modifications are also within the scope of the present invention.

To promote the heat transfer on a gas side in a heat exchanger between gas and water, the above-described fuel cell reforming apparatuses may fill a gas-side passage with a material, which has or enhances the heat conductivity, by spreading alumina balls, MacMahon packing or the like on the gas-side passage. For instance, a heat transfer enhancing material may be filled in between the reformer and the shift reactor or between shift reactor and the selective oxidation unit. Or the heat transfer enhancing material may be filled in on top of the selective oxidation unit or on a heat exchanger with the combustion gas on an inlet side of the steam supply passage or the like.

The raw fuel used for the above-described fuel cell reforming apparatuses is not limited to methane, propane or butane exemplified in the above embodiments. For example, carbon hydride such as natural gas, LPG mainly composed of propane and butane, naphtha, or kerosene, alcohols such as methanol or ethanol, ethers such as dimethyl ether, and the like may be used as the raw fuel.

While the preferred embodiments of the present invention have been described using specific terms, such description is for illustrative purposes only, and it is to be understood that changes and variations may be further made without departing from the spirit or scope of the appended claims.

What is claimed is:

1. A reforming apparatus, for use in a fuel cell, for reforming a raw fuel into a hydrogen-rich reformed gas, the apparatus comprising:
   a reformer which generates the reformed gas from the raw fuel;
   a shift reactor which reduces carbon monoxide contained in the reformed gas through a shift reaction;
   a selective oxidation unit which reduces the carbon monoxide contained in the reformed gas that has passed through said shift reactor by performing selective oxidation on the carbon monoxide;
   a reforming reaction tube which houses linearly said reformer, said shift reactor and said selective oxidation unit in this order;
   a combustion means which produces combustion exhaust gas by combusting the raw fuel;
   an outer casing, disposed around said reforming reaction tube, having a larger diameter than that of said reforming reaction tube; and
   a heated flow passage through which the combustion exhaust gas passes to heat said reforming reaction tube, said heated flow passage being formed between said reforming reaction tube and the outer casing,
   wherein
   said reforming reaction tube is arranged vertically such that a reformer side thereof is arranged at a lower position thereof and a selective oxidation unit side thereof is arranged at an upper position thereof,
   at least one of said shift reactor and said selective oxidation unit includes: a divider member which divides the interior of said reforming reaction tube into an upper portion and a lower portion; and a catalyst supported by the divider member from below, and
   said reforming reaction tube has a filler inlet, formed on a side surface above the divider member, through which the catalyst is filled therewithin.

2. A fuel cell reforming apparatus according to claim 1, further comprising a steam supply passage so provided that water passes through inside said reforming reaction tube to supply steam to said reformer, wherein said steam supply passage penetrates the divider member in a vertical direction through a through-hole formed in the divider member.

3. A fuel cell reforming apparatus according to claim 2, wherein said steam supply passage has a spiral portion formed in a coil-like shape and a linear portion extending in a vertical direction of said reforming reaction tube, wherein the divider member is so provided that said steam supply passage penetrates the divider member at the through-hole.

4. A fuel cell reforming apparatus according to claim 1, wherein the divider member has a ventilation opening such that the catalyst does not fall down and to a degree such that the reformed gas passes through the ventilation opening.

* * * * *